United States Patent
Smith et al.

(10) Patent No.: US 7,743,394 B2
(45) Date of Patent: Jun. 22, 2010

(54) LOG PROCESSING OF CHANNEL TUNES AND CHANNEL TUNE TIMES GENERATED FROM A TELEVISION PROCESSING DEVICE

(75) Inventors: Geoffrey R. Smith, Mountain View, CA (US); Kaustuv, Palo Alto, CA (US); Daniel J. Zigmond, Menlo Park, CA (US); Jay Shrauner, San Francisco, CA (US); John Alastair Hawkins, London (GB); Simon Rowe, Berkshire (GB); Michael A. Killianey, London (GB); Yaroslav Volovich, Cambridge (GB); Iain Merrick, London (GB)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 11/852,788

(22) Filed: Sep. 10, 2007

(65) Prior Publication Data

US 2008/0250453 A1    Oct. 9, 2008

Related U.S. Application Data

(60) Provisional application No. 60/909,893, filed on Apr. 3, 2007, provisional application No. 60/915,261, filed on May 1, 2007, provisional application No. 60/944,992, filed on Jun. 19, 2007.

(51) Int. Cl.
*H04N 7/16* (2006.01)
*H04H 60/32* (2008.01)

(52) U.S. Cl. ............... 725/19; 725/13; 725/14; 725/21

(58) Field of Classification Search .............. None
See application file for complete search history.

(56) References Cited

U.S. PATENT DOCUMENTS

| | | | |
|---|---|---|---|
| 5,857,190 A | 1/1999 | Brown | |
| 6,530,082 B1* | 3/2003 | Del Sesto et al. | 725/9 |
| 2002/0129368 A1* | 9/2002 | Schlack et al. | 725/46 |
| 2003/0037333 A1* | 2/2003 | Ghashghai et al. | 725/46 |
| 2003/0115585 A1* | 6/2003 | Barsness et al. | 725/9 |
| 2003/0171990 A1 | 9/2003 | Rao et al. | |
| 2004/0225562 A1 | 11/2004 | Turner | |
| 2004/0230994 A1* | 11/2004 | Urdang et al. | 725/88 |
| 2005/0021403 A1 | 1/2005 | Ozer et al. | |
| 2005/0028188 A1 | 2/2005 | Latona et al. | |
| 2005/0222902 A1 | 10/2005 | Coit et al. | |
| 2005/0235318 A1* | 10/2005 | Grauch et al. | 725/46 |
| 2005/0251444 A1 | 11/2005 | Varian et al. | |
| 2006/0224445 A1 | 10/2006 | Axe et al. | |

(Continued)

FOREIGN PATENT DOCUMENTS

KR  2000/0054179 A   9/2000

(Continued)

*Primary Examiner*—Scott Beliveau
*Assistant Examiner*—Patrick A Ryan
(74) *Attorney, Agent, or Firm*—Fish & Richardson P.C.

(57) ABSTRACT

Reporting data related to content processing devices, e.g., television devices, are processed to identify channel tunes and corresponding tune times of the content processing devices. Automatically generated channel tunes based on the corresponding tune times are identified. Content items that are aired during a time period defined by the corresponding tune times can be adjusted.

23 Claims, 12 Drawing Sheets

U.S. PATENT DOCUMENTS

| | | |
|---|---|---|
| 2006/0253323 A1 | 11/2006 | Phan et al. |
| 2007/0011050 A1 | 1/2007 | Klopf et al. |
| 2007/0022032 A1 | 1/2007 | Anderson et al. |
| 2007/0186229 A1* | 8/2007 | Conklin et al. ................ 725/14 |
| 2007/0282906 A1 | 12/2007 | Gabriel |
| 2008/0019610 A1 | 1/2008 | Matsuzaka et al. |
| 2008/0092168 A1 | 4/2008 | Logan et al. |
| 2008/0092182 A1 | 4/2008 | Conant |
| 2008/0216107 A1* | 9/2008 | Downey et al. ................ 725/22 |
| 2009/0070836 A1 | 3/2009 | Aaby et al. |

FOREIGN PATENT DOCUMENTS

| | | |
|---|---|---|
| KR | 2003/0070275 A | 8/2003 |
| KR | 2006/0097268 A | 9/2006 |
| WO | WO99/52285 A1 | 10/1999 |
| WO | WO03/050731 A2 | 6/2003 |
| WO | WO2005/010702 A2 | 2/2005 |
| WO | 2006/020560 A2 | 2/2006 |
| WO | WO2006/020560 A2 | 2/2006 |
| WO | WO2006/127645 A2 | 11/2006 |

* cited by examiner

LOG PROCESSING OF CHANNEL TUNES AND CHANNEL TUNE TIMES GENERATED FROM A TELEVISION PROCESSING DEVICE

This application claims the benefit of U.S. Application Ser. No. 60/909,893, entitled "Television Advertising," filed on Apr. 3, 2007; U.S. Application Ser. No. 60/915,261, entitled "Log Processing," filed on May 1, 2007; and U.S. Application Ser. No. 60/944,992, entitled "Log Processing," filed on Jun. 19, 2007, the disclosures of which are incorporated herein by reference.

BACKGROUND

This disclosure relates to media advertising.

An advertiser, such as a business entity, can purchase airtime during a television broadcast to air television advertisements. Example television advertisements include commercials that are aired during a program break, transparent overlays that are aired during a program, and text banners that are aired during a program, product placements in a program, etc.

The cost of the airtime purchased by the advertiser varies according to the audience size and audience composition expected to be watching during the purchased airtime or closely related to the purchased airtime. The audience size and audience composition, for example, can be measured by a ratings system. Data for television ratings can, for example, be collected by viewer surveys in which viewers provide a diary of viewing habits; or by set meters that automatically collect viewing habit data and transmit the data over a wired connection, e.g., a phone line or cable line; or by digital video recorder service logs, for example. Such rating systems, however, may be inaccurate for niche programming, and typically provides only an estimate of the actual audience numbers and audience composition.

Based on the ratings estimate, airtime is offered to advertisers for a fee. Typically the advertiser must purchase the airtime well in advance of the airtime. Additionally, the advertiser and/or the television provider may not realize the true value of the airtime purchased if the ratings estimate is inaccurate. Finally, if the advertiser and/or the television provider participates in a revenue agreement based on the number of identified viewings of an advertisement, accurate data relating to the potential viewing audience during the time the advertisement aired must be obtained in order to produce a fair result.

SUMMARY

Systems, methods and apparatus for processing logs of television processing devices, e.g., set top boxes, digital video recorders, etc. are described. In one implementation, reporting data related to television processing devices are received and channel tunes and corresponding tune times of the television processing devices are identified. Channel tune clusters at corresponding tune times are identified as automatically generated channel tunes.

In another implementation, reporting data related to television processing devices are received and channel tunes and corresponding tune times of the television processing devices are identified. Triggering tune times are identified, and tune times corresponding to the triggering tune times are likewise identified. Channel tunes occurring at the tunes times corresponding to the triggering tune times are identified as automatically generated channel tunes.

In another implementation, a system includes an automated tuning detection engine and an accounting engine. The automated tuning detection engine is configured to receive reporting data related to television processing devices, identify channel tunes and corresponding tune times of the television processing devices from the reporting data, and identify automatically generated channel tunes based on the corresponding tune times. The accounting engine is configured to adjust advertising costs associated with advertisements based on the identified automatically generated channel tune times.

BRIEF DESCRIPTION OF THE DRAWINGS

Like reference numbers and designations in the various drawings indicate like elements.

DETAILED DESCRIPTION

Figure 1:
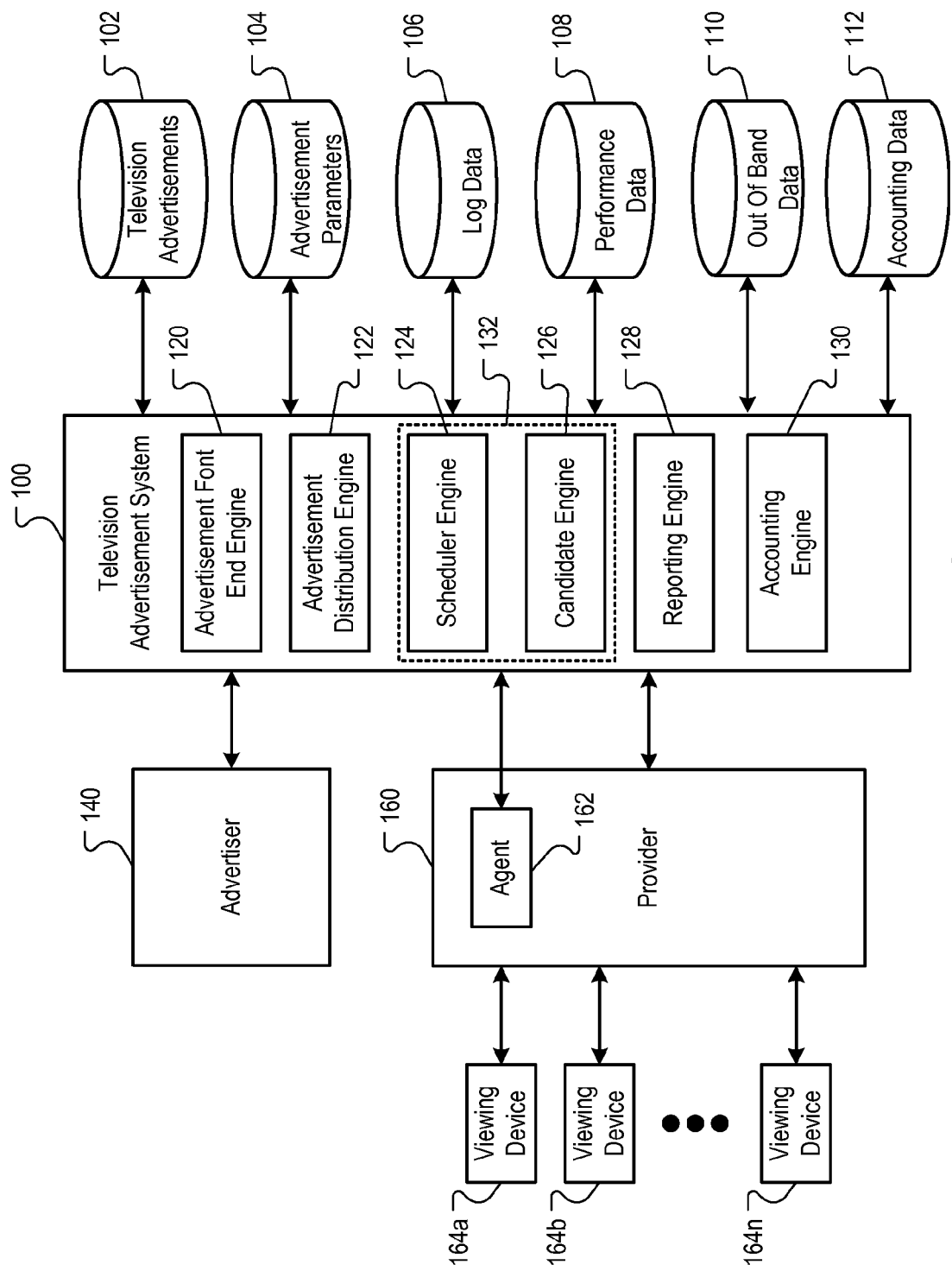
FIG. 1 is a block diagram of an example television advertisement system.

FIG. 1 is a block diagram of an example television advertisement system 100. The television advertising system 100 can, for example, deliver relevant content items (e.g., television advertisements, and hereinafter referred to generally as advertisements) advertisements to viewers to facilitate operator monetization of programming and quantification of advertisement delivery to target markets. The television advertising system 100 can, for example, be implemented on one or computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertising system 100 can, for example, communicate over several different types of networks, e.g., the Internet, a satellite network, and a telephonic network.

In general, the television advertising system 100 can receive television advertisements and advertisement campaign data from an advertiser 140, e.g. an entity that provides television advertisements, such as a commercial entity that sells products or services, an advertising agency, or a person. The television advertising system 100 can facilitate the provisioning of television advertisements to a television provider 160, e.g., an entity that facilitates the delivery of a television broadcast to viewers, such as cable provider, a digital satellite provider, a streaming media provider, or some other media provider. The provider 160 can, for example, receive a provider agent 162 from the television advertisement system 100. The provider agent 162 can, for example, be located at an advertising broadcast insertion location of the provider 162, e.g., at a head end of the provider.

The provider agent 162 can, for example, receive advertisement availability schedules from the provider 160 and provide the advertisement availability schedules to the television advertising system 100. Example advertisement availability schedules include scheduling data related to advertisement spots, times slots, pods (groups of time slots), screen real estate (e.g., a region in a text banner or screen corner for an overlay), etc. For example, the provider agent 162 can read schedule requests, either in real time or ahead of time, and identify which schedule times the television advertising system 100 has permission to fill with advertisements provided by the television advertising system 100. Alternatively, the provider agent 162 can determine if one or more advertisements already scheduled or should/can be preempted or receive information that a scheduled advertisement should be preempted in accordance with one or more criteria (e.g., to improve revenue generation for the provider, or if an advertiser's budget has been depleted after a related advertisement was scheduled, etc.). The provider agent 162 can request the television advertising system 100 to identify a relevant advertisement for an identified airtime advertisement spot, e.g., an open advertisement slot or a preempted advertisement slot.

The advertisement can be deemed relevant based on advertisement meta data and an advertisement context, e.g., an advertisement for extreme sporting equipment for an advertisement having an available advertising budget may be selected for airing during a televised sporting event for which the meta data identifies as a primary demographic 18-30 year old males.

The television advertising system 100 can, for example, select candidate advertisements to air during an advertisement availability based on account advertiser bids, budgets, and any quality metrics that have been collected, e.g., conversions, viewer actions, impressions, etc. For example, advertisements can be selected to air during the advertisement availability according to a computer-implemented auction. One exampling auction is a Vickrey-style in which each advertiser pays the bid of the next highest advertisement. Other auction processes can also be used, e.g., setting an advertiser bid equal to the estimated number of viewer impressions multiplied by the price an advertiser has offered to pay for each impression, etc.

Different bidding types can be implemented in the computer-implemented auction. For example, the bidding types can be cost per airing, a cost per impression, a cost per full viewing of the advertisement, a cost per partial viewing of the advertisement, etc. Other types of costs per actions can also be use, such as a phone calls resulting from phone call solicitations; a cost per network airing (e.g., $5.00 per 1000 impressions on a first network, $6.00 per 1000 impressions on a second network), cost per action scaled by the time of day, etc. An auction process can, for example, support ads with different or even multiple (hybrid) bidding types.

The advertisements selected from the television advertising system 100 auction, the advertisement air time, and/or the advertisement can be provided to the provider 160. For example, all available advertisements, or a subset thereof, can be provided to the provider 160 prior to airing, and the provider agent 162 need only receive an advertisement identifier indicating which advertisement is to air during particular advertisement air time.

The provider agent 162 can thereafter provide a status to the television advertisement system 100 regarding when the advertisement aired. The provider agent 162 can also, for example, provide anonymized impression data related to viewing devices 164a-164n. Example viewing devices include set top boxes, digital video recorders and tuners, and other television processing devices that facilitate the viewing of the television signal on a television device. For example, logs related to viewing device 164 activity, e.g., set top box logs, can be anonymized to remove personal information related to viewing activities and provided to the television advertising system 100. In another implementation, such information can be provided by the provider 160, or by a third party.

In one implementation, based on the impression data for the airing of the advertisement, the television advertising system 100 can charge an advertiser a fee for airing the advertisement. The fee can, for example, be substantially in proportion to the number of impressions determined for a particular airing of an advertisement.

In one implementation, the fee can, for example, be based on the bidding type. For example, the bid may be based on a cost per airing, and thus an advertiser would be charged a fee for the airing of the advertisement. Other fee determinations can also be used.

The impressions can, for example, be measured statistically. An impression can be a household impression, e.g., the airing of an advertisement in household and independent of the number of televisions in a household. If the advertisement is aired on a viewing device in the household, one household impression can be recorded. Other impression types can also be used. For example, impressions can be generated by a program rating percentage, e.g., a percentage of viewership in measurable households; or by a program share percentage, e.g., a percentage of viewership in active measured homes; or by some other statistical measurement.

By way of another example, impressions can be measured by an analysis of activity logs of the viewing devices 164. For example, a household may have three viewing devices 164, and at a given time two of the devices may be tuned to a first channel and the third device may be tuned to a second channel. If a first commercial airs on the first channel and a second commercial airs on the second channel, impressions can be generated for each viewing device.

An impression can be dependent on a channel tune status when an advertisement airs on a channel. For example, an impression can occur when a viewing device 164 is tuned to a broadcast stream in which an advertisement is inserted, and the viewing device 164 remains tuned to the broadcast stream for N consecutive seconds during the actual display time of the insertion. For example, an impression can be defined as a viewing device remaining tuned to a broadcast stream for five seconds after the advertisement begins to air. Alternatively, an impression can be defined as a viewing device tuned to a broadcast stream when an advertisement is airing and remaining tuned to the broadcast stream for five seconds after tuning to the broadcast stream. Other tune times can also be used.

Likewise, other impression types can also be used. For example, an impression can based on an advertisement exposure, e.g., a brief exposure of an advertisement, or a full viewing of the advertisement, of a threshold viewing in between, e.g., five seconds, or five seconds of the first fifteen seconds; or a percentage of the advertisement viewed, etc.

In an implementation, the television advertisement system 100 can also include one or more data stores to store television advertisements and associated data, e.g., meta data related to the television advertisements, performance data related to the television advertisements, accounting data related to the advertisers and television advertisements, etc. In one implementation, the television advertising system 100 includes an advertisement data store 102, an advertisement parameter store 104, a log data store 106, a performance data store 108, and an out of band data store 110. Additional advertisement related data can also be stored, e.g., an accounting data store 112 can store accounting data.

The television advertisement data store 102 can, for example, include advertisements that can be broadcast or aired during an advertisement spot. Example television advertisements include video advertisements, banner advertisements, overlay advertisements, such as logos, URLs, dynamic pricing information for an advertisement, etc., and other advertisements that can be used to convey information visually and/or aurally during a television broadcast.

The television advertisement parameter data store 104 can, for example, include cost per action parameters, frequency values, competitive restrictions, advertising budget data, geographic data, targeting data, etc. The television advertisement parameters 104 can, for example, be specified by the advertiser 140, and/or can be automatically updated based on the performance of advertisements during an advertisement campaign.

The log data store 106 can include data logs from viewing devices 164, e.g., set top boxes, satellite receivers, etc. The log data can include reporting data that identifies channel tunes, e.g., a channel identifier to which the viewing device was tuned, such as may occur which the viewing device 164 is processing video data to record and/or display, and channel tune times, e.g., the times that the viewing device was tuned to a channel. Other data can also be included, e.g., key presses of remote devices associated with the viewing devices 164, commands received by the viewing devices 164, etc. For example, if the viewing device 164 is a digital video recorder, the log data can include a list of recorded programs, and for each recorded program a record that indicates whether the recorded program has been played back, and the actions taken during playback, such as fast forwarding or skipping commercials can be included.

The performance data store 108 can, for example, include quality data, e.g., a total number of impressions for each advertisement, or an impression rate for each advertisement, and/or other quality parameter and/or impression parameters. Example impression rates include a percentage of total potential viewers, e.g., the number of identified impressions divided by the number of subscribers; a percentage of actual impressions of a total number of impressions, e.g., a percentage of reliable impressions divided by a total number of impressions. An example reliable impression is an impression that satisfies a rule set or condition that determines that the impression was likely viewed on a viewing device by one or more persons.

Other performance data can also be stored in the performance data store 108, e.g., performance of a particular advertisement during particular programming, the probability that viewers will tune to another channel during an advertisement; the probability that viewers will fast-forward through the advertisement; etc. Such probabilities can be normalized to average behavior on a per-advertisement basis, or on a per-time slot basis, or on some other measurable basis.

Performance data can also include data related to how much of an advertisement a viewer watched when the advertisement aired. For example, statistics related to aggregate tune-in and tune-out times; number of viewers, etc. can be measured and evaluated to determine quality data related to advertisements based on viewing percentages.

The out of band data store 100 can, for example, include data related to the relevance or popularity of particular advertisements, advertisement subject matter, and television programs. For example, web pages can be mined to determine whether particular television programs are expected to have increased viewership, e.g., a sudden increase in fan pages for a program can be correlated to an increase in an expected ratings value, and the resulting data can be stored in the out of band data store 110. Other data can include data related to search queries, page views on an advertise site, etc.

Likewise, the out of band data store 110 can, for example, store date resulting from mining a video web site to identify television advertisements that are particularly popular, e.g., a video web site may record viewing statistics that indicate a particularly humorous advertisement is relatively popular among a certain demographic. Such data can be used to further refine the advertising selection process.

Additionally, web sites related to television programs can be mined to determine relevance of products or services related to the television program. For example, a particular program may reference a product in an episode, and the mining of fan sites related to the program may reveal that the product mention has generated a significant interest in the product and related products. Accordingly, advertisements related to the product and related products may be deemed more relevant for time slots during the program.

The accounting data store 112 can, for example, store accounting data related to advertisements and advertisers 140. The accounting data store 112 can store such data as campaign budgets, monthly spend parameters, and account balances for advertisers.

Other data can also be stored, such as data that can be utilized to adjust viewing forecasts, adjust pricing models, adjust relevancy measures, etc. For example, performance data related to certain products or services advertised, e.g., anonymized historical campaign data, trend analysis of program viewership, e.g., viewing statistics of program series episodes in first run, repeat, and syndication, etc. can be stored for analysis. In one implementation, data related to advertisements that were aired during time slots not served by the advertisement system 100 can be stored to analyze other advertising market models, e.g., fixed priced advertising markets, reserved advertising markets, etc.

The advertisement data store 102, advertisement parameter store 104, log data store 106, performance data store 108, the out of band data store 110 and the accounting data store 112 can be implemented separately or in combination. For example, in one implementation, the advertisement data store 102, advertisement parameter store 104 and performance data store 108 can be implemented in a single advertisement database. Other combinations and/or subcombinations can also be used.

The television advertisement system 100 can include an advertisement front end engine 120, an advertisement distribution engine 122, a scheduler engine 124, a candidate engine 126, a reporting engine 128, and an accounting engine 130. The advertisement front end engine 120, advertisement distribution engine 122, scheduler engine 124, candidate engine 126, reporting engine 128, and accounting engine 130 can, for example, be distributed among a plurality of computer devices, e.g. server computers communicating over a network, or can be implemented on a single computer, e.g., as multiple threads on a server computer. Other implementation architectures can also be used. The advertisement front end engine 120, advertisement distribution engine 122, scheduler engine 124, candidate engine 126, reporting engine 128, and accounting engine 130 can, for example, be implemented in software, such as executable object code, interpreted script instructions, or in combinations of executable and interpreted instructions. Other software and/or hardware implementations can also be used.

The advertisement front end engine 120 can, for example, be configured to receive advertisement data and television advertisements from the advertiser 140 and associate the advertisement data with the television advertisements. In one implementation, the advertisement front end engine 140 can include a web-based interface through which the advertiser 140 can upload television advertisements and associated campaign data, e.g., advertising budgets, targeting data, such as demographics and air times, product and/or service description data, such as vertical classifications, price ranges, subject matter, etc.

In one implementation, the advertisement front end engine 120 can include an approval engine configured to identify a television advertisement pending approval by the television provider 160. Utilizing the approval engine 160, the publisher may optionally review an advertisement and either approve or disapprove of the advertisement. For example, a cable provider may disapprove of advertisements that are of particularly low quality, e.g., poor sound quality, incorrect advertisement data, etc.

The advertisement distribution engine 122 can, for example, be configured to provide approved advertisements to the television provider 160. In one implementation, the advertisements are provided to the television provider 160 in advance of airing the advertisements. The provider agent 162 can periodically issue a request to the television advertising system 100 for any new advertisements to be downloaded. For any such advertisements, the provider agent 162 or the distribution engine 122 can initiate the download, and upon successful completion the provider agent 162 can notify the television advertising system 100 of a successful download. The television advertising system 100 can, for example, label the download with a particular ID that can be later user during scheduling to identify the scheduled advertisement. Accordingly, the publisher 160 can receive an advertisement identifier associated with advertisement availability, e.g., a time slot, and can retrieve the advertisement locally at the television provider 160 premises and insert the selected advertisement into the broadcast stream.

The television advertisement scheduler engine 124 can, for example, be configured to receive a television advertisement request defining television advertisement availability from the television provider 160, and issue a request for candidate television advertisement data, e.g., data related to advertisements that are candidates for being selected to fill the advertisement availability. The television advertisement request can include geographic data, provider identification, network data, program data, and other data. For example, a request can specify advertisements that can be shown in the geographic area of the USA/California/Bay Area/Mountain View, with a remoteRepositoryId of XX of a television provider, for a television provider YY, on a television network ZZ, to be scheduled within the time window of Monday 2:00 PM-3:00 PM, and at a preferred time of 2:16 PM.

The candidate engine 126 can, for example, be configured to identify candidate television advertisement data in response to the request for candidate television advertisement data. The identification can be based on data associated with the television advertisements, such as the data stored in the advertisement parameter data store 104. The candidate engine 126 can implement various targeting and/or filtering rules. For example, a budget restriction can be imposed if an advertiser budget is nearly depleted, and the expected fee for airing the advertisement based on expected impressions would exceed the remaining advertising budget.

Other example rules include the advertisement being successfully downloaded to the television provider 160; the advertisement targeting the location or a superset of the location where the advertisement will be showing; the advertiser 140 or advertisement must not be considered fraudulent or delinquent; the publisher 160 has approved the advertisement for showing; the advertisement is targeting this particular television network and/or time; the advertisement is targeting a television program which, through internal or third party data sources, corresponds to the given request; and the advertisement is targeting a demographic profile which, through internal or third party data sources, corresponds to the given request. Fewer or more filtering and targeting conditions can also be applied.

In response to receiving the candidate advertisement data, the television advertisement scheduler engine 124 can select one or more television advertisements to air during the television advertisement availability. The selection can be based on the television advertisement request and the candidate television advertisement data. For example, the television advertisement request can be utilized to determine a context, e.g., the context of the programming associated with the advertisement, such as sporting event, an entertainment genre, a news program, etc.; or the context of the television network, e.g., a network type; or the context of a television channel; or the context of the time of day; or a combination of any of such examples. The context can be utilized to determine a relevancy score, and the relevancy score can be utilized to scale an auction result so that bids related to advertisements that are more relevant to the identified context are scaled higher than bids related to less relevant advertisements.

In an implementation, the scheduler engine 124 and/or the candidate engine 126 can enforce advertisement restrictions. For example, the scheduler engine 124 and/or the candidate engine 126 can filter the advertisements to eliminate unwanted advertisements, e.g., frequency capping can be performed to limit the scheduling of certain advertisements based on an amount of time since the advertisement was last aired; competitive restrictions can be applied so that one advertisement cannot be placed near another advertisement of a competitor, etc.

The reporting engine 128 can, for example, receive television advertisement report data from the provider 160 and determine whether the selected television advertisement aired based on the television advertisement report data. For example, an advertisement may not air due to a programming irregularity, e.g., a sporting event going beyond a scheduled broadcast, an interruption to scheduled programming due to breaking news, etc. In an implementation, the reporting engine 128 can process reporting logs, e.g., set top box logs, from viewing devices 164 to determine advertisement impressions and/or false positive impressions.

The accounting engine 130 can, for example, receive the impression data from the reporting engine 128 and generate accounting data for advertisers. In one implementation, the accounting data can detail fees owed to the television advertising system 100. The fees can, for example, be based on a cost per action parameter associated with an advertisement. For example, if an advertiser has specified $10.00 as a maximum cost per thousand impressions for a television commercial, and the reporting data indicates that 420,000 reliable impressions were generated from airing the advertisement, then the advertiser may be billed for $4,200.

In another implementation, the accounting data can detail fees owed to the television advertising system 100 and the publisher pursuant to a revenue sharing agreement. An example revenue sharing agreement can include a percentage split between the operator of the television advertisement system 100 and the television provider 160. For example, the operator of the television advertising system may receive 20% of the fee, and the operator of the publisher 160 may receive the remaining 80% of the fee. Another example revenue sharing agreement can include a first fee up to a maximum cap going to the operator of the television advertisement system, and the remaining fee going to the operator of the television provider 160. For example, the operator of the television advertising system may receive the first $500 of the fee, and the operator of the publisher 160 may receive the remainder of the fee. Other revenue sharing agreements can also be used.

The advertisement front end engine 120, advertisement distribution engine 122, scheduler engine 124, candidate engine 126, reporting engine 128, and accounting engine 130 can be implemented separately or in combination. For example, in one implementation, the scheduler engine 124 and the candidate engine 126 can be integrated as a single auction engine 132 on a computing device. Other combinations and/or subcombinations can also be used.

The system 100 of FIG. 1 can also facilitate the serving of other types of advertisement availabilities. For example, in addition to serving advertisement availabilities related to advertisement spots, times slots, and pods, advertisement availabilities that are dynamic, e.g., availabilities that are decided in real time, can also be served. An example dynamic availability can include the canceling of a scheduled advertisement, either at the request of the advertiser or automatically, such as when the advertiser's budget is depleted; or in the event of a programming delay, e.g., a programming delay for a live event, etc.

Figure 2:
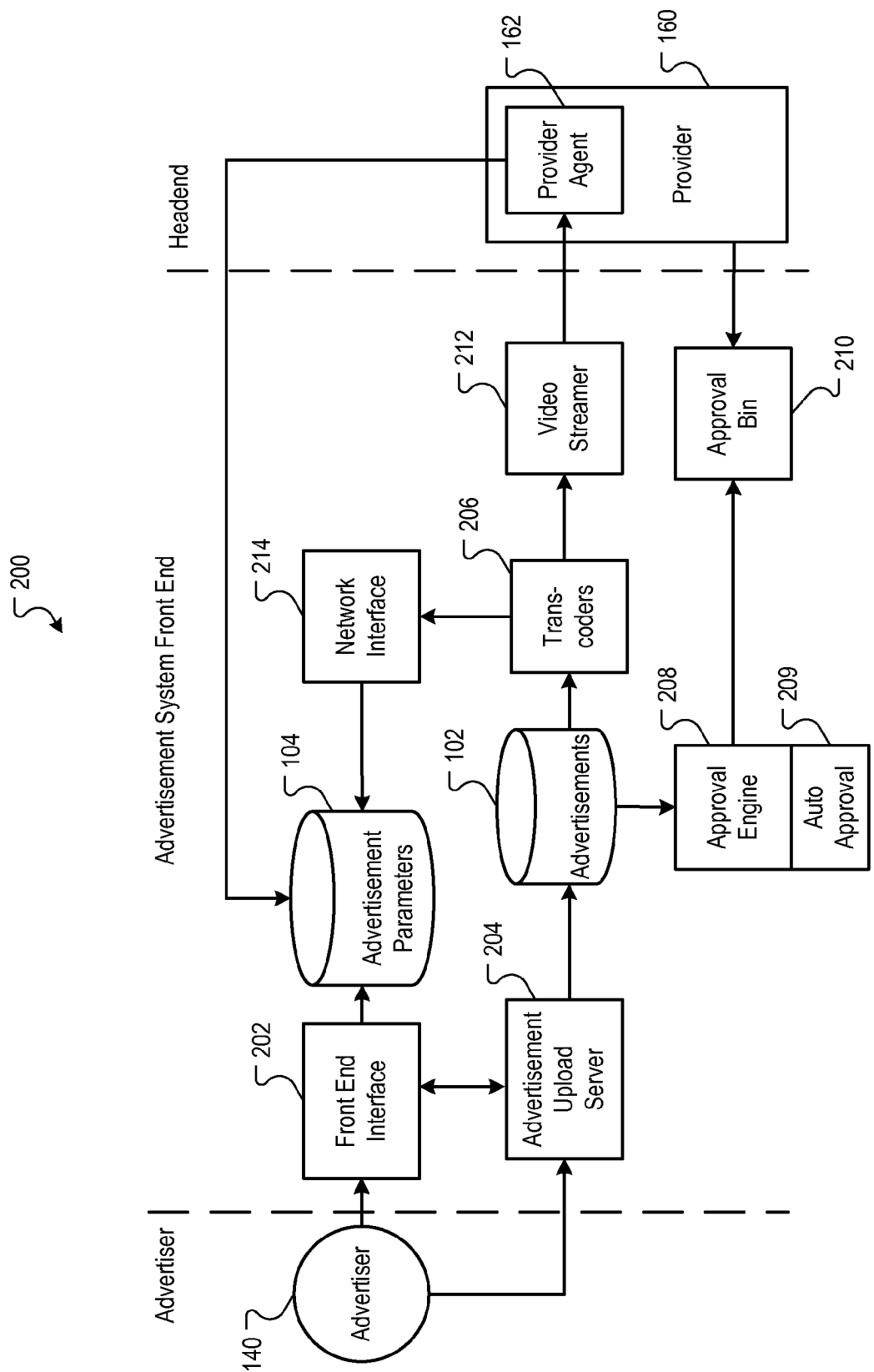
FIG. 2 is a block diagram of an example television advertisement system front end.

FIG. 2 is a block diagram of an example television advertisement front end system 200. The television advertisement front end system 200 can, for example, be implemented in the advertisement system 100 of FIG. 1.

The advertisement front end system 200 can facilitate the provisioning of advertisement data and television advertisements from the advertiser 140 or an agent of the advertiser, and can facilitate associating the advertisement data with the television advertisements. In one implementation, the advertisement front end system 200 can include a web-based front end interface 202 and an advertisement upload server 204 through which the advertiser 140 can upload television advertisements and associated campaign data associated with the advertisements, e.g., advertising budgets, targeting data, such as demographics and air times, product and/or service description data, such as vertical classifications, price ranges, subject matter, etc. FIGS. 5-9 provide example front end user interface environments.

In one implementation, the advertisement upload server 204 can receive digital representations of the advertisements, e.g., video files, audio files, and text data files, that define the advertisements, e.g. video advertisements, including commercials, banners, and logo overlays; audio advertisements, and text-based advertisements. In another implementation, the advertisements can be provided to the advertising front end system 200 in either digital or analog form, e.g., video tapes, DVDs, etc., for processing for storage into the advertisement data store 102.

The advertisements stored in the advertisement data store 102 may require transcoding into one or more different presentation formats. For example, an advertisement may be provided in high definition and in a first aspect ratio; the advertisement may thus be transcoded to conform to another video standard, such as NTSC or PAL. The transcoded advertisements can be accessed by a video streamer 212 and provided to provider 160 for local storage. In one implementation, the provider agent 162 can poll the advertisement front end system 200 periodically, e.g., daily or weekly, to request any new advertisements that have been uploaded and processed by the advertisement front end system 200. Alternatively, the provider agent 162 can request now advertisements after being unable to locate an advertisement locally, or if the provider 160 indicates that an advertisement cannot be located in a local data store.

In one implementation, newly added advertisements can be designated as pending approval, and an approval engine 208 can be configured to identify television advertisements pending approval by a television provider and store the pending advertisements, or links to the pending advertisements, in an approval bin 210. The approval engine can receive television provider 160 approval data for each television advertisement pending approval and approve or disapprove the television advertisement based on the television provider approval data. Approved advertisements can thereafter be downloaded or otherwise accessed by the provider 160; conversely, disapproved advertisements will not be provided to the provider 160. Accordingly, only approved advertisements will air on broadcast signals generated by the provider 160.

In one implementation, advertisements awaiting approval can be automatically approved after an expiration of a time period, e.g., 72 hours. In another implementation, advertisements awaiting approval can be automatically disapproved after an expiration of the time period.

In another implementation, the approval engine can receive front end system 200 approval data for each television advertisement pending approval and approve or disapprove the television advertisement based on the front end system 200 approval data. For example, an operator of the front end system 200 may enforce various polices for advertisements, e.g., quality requirements, subject matter, etc.

In one implementation, the approval engine 208 can include an automated approval engine 209 that is configured to store approval criteria for each presentation format and evaluate a television advertisement in a presentation format against the corresponding approval criteria. Based on the evaluation, the automated approval engine 209 can automatically approve or disapprove the advertisement. For example, approval criteria based on color balance, sound balance, etc.

can be utilized to automatically approve a transcoded advertisement. The automatically approved advertisements or access to the automatically approved advertisements can thereafter be provided to the approval bin 210.

After the advertisements are downloaded to the provider 160, or after the provider is otherwise provided access to the advertisements so that the advertisements can be aired by the provider, the provider agent 162 can provide an acknowledgment signal to the advertisement front end system 200. The acknowledgement signal can, for example, specify that the publisher has received an advertisement or otherwise has access to the advertisement for airing. The acknowledgement signal can identify the publisher and be stored in the advertisement parameter data store 104 so that each advertisement can be associated with a corresponding list of publishers 160 that can air the advertisement.

In one implementation, a network interface 214 can be utilized to provide access to the advertisements stored in the advertisement data store 104. For example, the network interface 214 can include a search engine interface and can serve the advertisements over a network, such as the Internet, in response to search queries that are relevant to the advertisement. In an implementation, the advertiser 140 can specify whether an advertisement that can be aired by the publisher can likewise be served over a network through the network interface 214.

Figure 3:
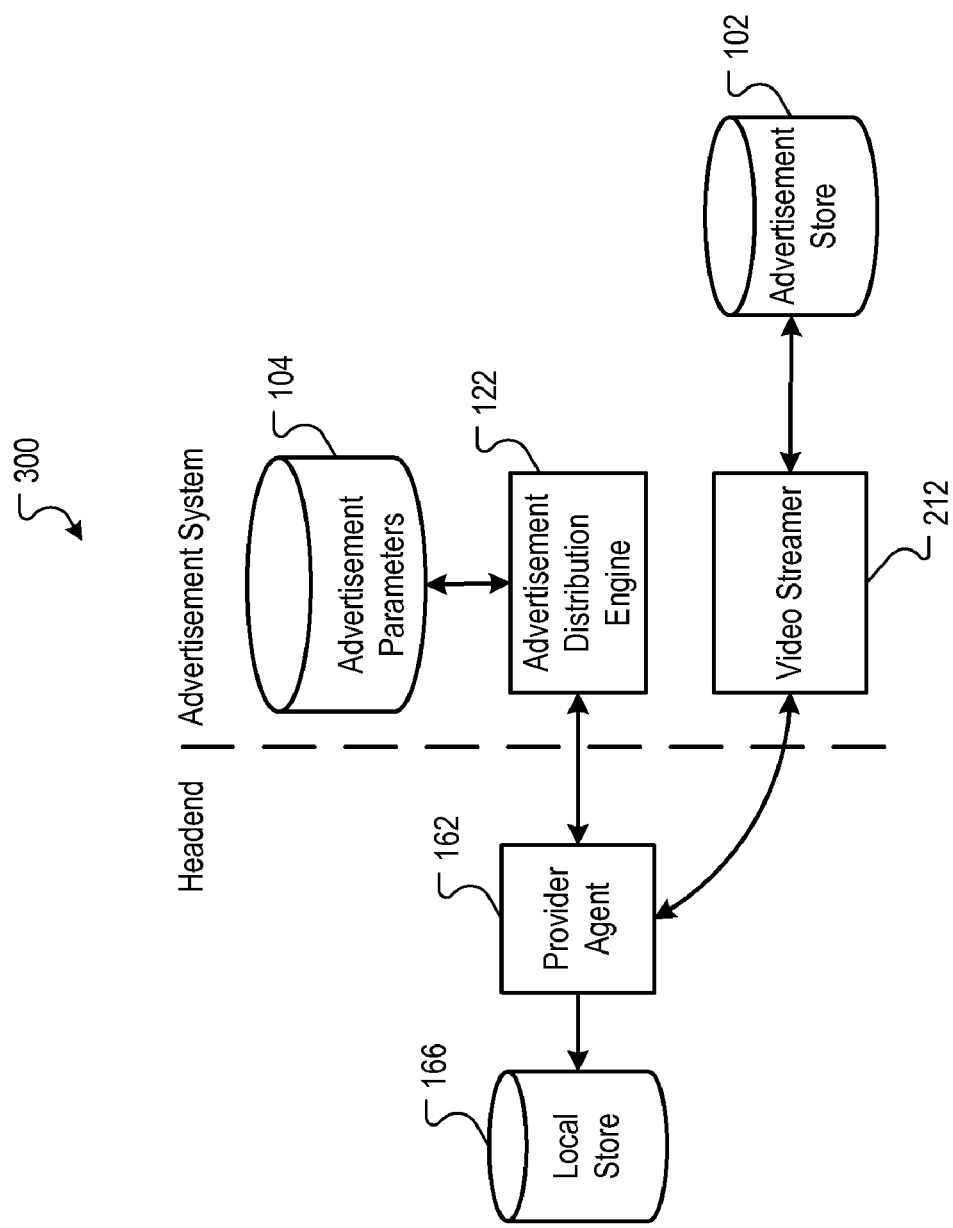
FIG. 3 is a block diagram of an example television advertisement distribution system.

FIG. 3 is a block diagram of an example television advertisement distribution system 300. The advertisement distribution system 300 can, for example, be implemented in the advertisement system 100 of FIG. 1.

The advertisement distribution system 300 facilitates the storing of advertisements on a local data store, e.g., local store 166, associated with the television advertiser 160. The storage of the advertisement at a local store 166 can, for example, facilitate real-time or near real-time auctioning and scheduling of advertisements, e.g., auctioning and scheduling advertisements for available time slots or spots only hours or even minutes before the occurrence of the time slot.

In one implementation, the provider agent 162 can communicate with the advertisement distribution engine 122 to determine whether advertisements are available for storage on the local store 166. In one implementation, the provider agent 162 can poll the advertisement distribution engine 122 periodically, e.g., daily, weekly, etc. In another implementation, the advertisement distribution engine 122 can send a notification to the provider agent 162 when an advertisement is available for download, e.g., in response to the provider 160 approving one or more advertisements.

If advertisements are available for download, the advertisement distribution engine 122 can direct the provider agent 162 and a video streamer, e.g., the video steamer 212, to establish a communication session for downloading the advertisements from the advertisement store 102 to the local store 166. Additional data can also be downloaded, e.g., an advertisement identifier, or other advertisement parameters, e.g., stored in the advertisement parameter store 104. Upon a successful completion of the download, the provider agent 162 can send an acknowledgement signal to the advertisement distribution engine 122. The acknowledgment signal can, for example, be utilized to associate an advertisement with a television provider location, and to indicate that the television advertisement is stored in a local store 166 at the locus of the provider 160.

In one implementation, the advertisement distribution engine 122 can evaluate advertisement parameters stored in the advertisement parameter store 104 to determine to which providers 160 the advertisements should be distributed. For example, if the advertisement parameters specify that an advertisement is related to a California marketing campaign, the advertisement will only be distributed to providers 160 that service the California market.

In one implementation, the advertisement can be transcoded by the advertisement system 100 into a presentation format specified by the provider 160. In another implementation, the provider 160 can receive the advertisement in a standard format, e.g., and MPEG format, and transcode the advertisement into a suitable presentation format.

In another implementation, the advertisements can be streamed from the television advertising system 100 to the provider 162 in near-real time or during air time. Accordingly, the advertisements need not be stored in a local data store 166.

Figure 4:
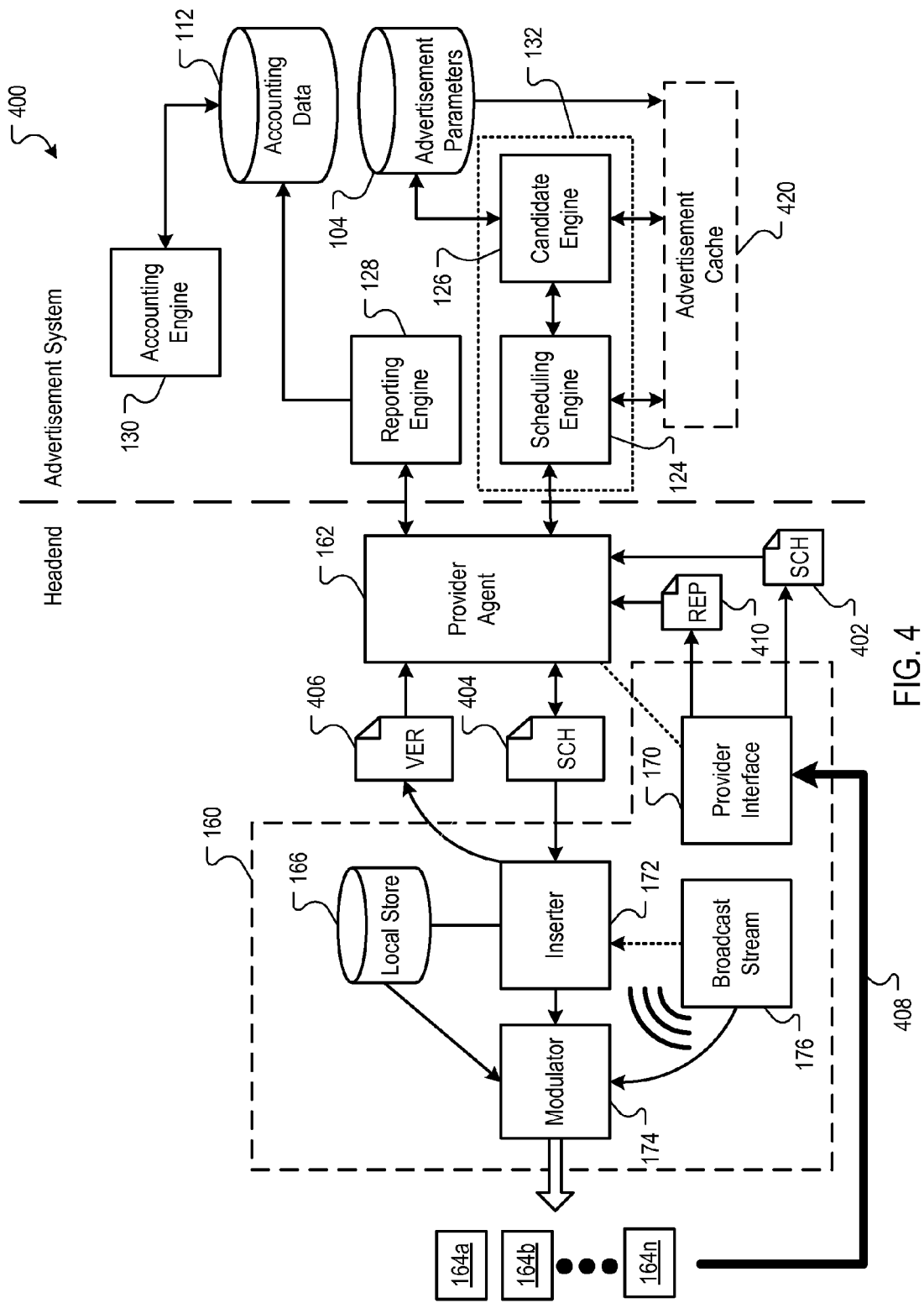
FIG. 4 is a block diagram of an example television advertisement scheduling and reporting system.

FIG. 4 is a block diagram of an example television advertisement scheduling and reporting system 400. The television advertisement scheduling and reporting system 400 can, for example, be implemented in the advertisement system 100 of FIG. 1.

In one implementation, the provider agent 162 can receive advertisement requests or advertisement availabilities in the form of an availability schedule 402. The availability schedule 402 can include a list of advertisement availabilities, e.g., time slots, corresponding contexts, e.g., television programs, the advertisement availability type, e.g., a single spot or a pod of several spots; and other data, such as geographic data, provider identification data, network data, etc.

The availability schedule 402 can, for example, be provided periodically, e.g., on a weekly basis for a coming week; or on a daily basis, or at near real-time or in real time. The provider agent 162 can, for example, communication with a provider interface 170, such as an API for a data server managed by the provider 160. In another implementation, the provider interface 170 can be implemented in the provider agent 162.

The provider agent 162 can provide the availability schedule 402 to the scheduling engine 124 of the advertisement scheduling and reporting system 400. The scheduling engine 124 can, for example, communicate with the candidate engine 126 to identify candidate television advertisement data associated with advertisements that are eligible to fill the advertisement spots that are specified in the availability schedule 402. The candidate engine 126 can implement various targeting and/or filtering rules as described with respect to FIG. 1 above.

The scheduling engine 124 can select one or more television advertisements to air during the television advertisement availability defined in the availability schedule 402. The selection can be based on the availability schedule 402, e.g., the time slots and associated context, and the candidate television advertisement data. The context can be utilized to determine a relevancy score, and the relevancy score can be utilized to scale an auction result so that bids related to advertisements that are more relevant to the identified context are scaled higher than bids related to less relevant advertisements.

The scheduling engine 124 can utilize a Vickrey-style auction based on a cost per action, e.g., a cost per 1000 impressions, or a cost per network ($5.00 on network M, $6.00 on network Y), etc. multiplied by a quality score, e.g., a historical impression rate associated with the advertisement, such as a number of viewers that are determined to have viewed the advertisement divided by the total number of viewers that received the advertisement. Other factors that can be used to determine the quality score can be derived from the performance data stored in performance data store 108, e.g., the performance of a particular advertisement during particular programming, the probability that viewers will tune to another channel during an advertisement; the probability that viewers will fast-forward through the advertisement; etc.

For example, assume the candidate engine 126 identifies three advertisements suitable for a particular advertisement spot. The scheduling engine 124 may determine an auction rank of the advertisements by multiplying the maximum cost per action for the advertisements by the quality score of the advertisements. To illustrate, suppose the quality score (QS) of advertisements A, B, and C are "2," "3," and "1.2," respectively. The rank of advertisements A, B, and C can be determined as follows:

A: Rank=QS×maximum cost per action=2.0×$5.00=10.00
B: Rank=QS×maximum cost per action=3.0×$7.50=22.50
C: Rank=QS×maximum cost per action=1.2×$10.00=12.00

The advertisers can thus be ranked as follows:
 1. B
 2. C
 3. A

Accordingly, the advertisement B would be selected and displayed during the advertisement spot. In one implementation, the actual cost an owner of the advertisement B will pay per thousand impressions can be determined by the subsequent advertisement rank (C) divided by the score of the advertisement B, e.g., 12/3=$4.00. Other auction processes can also be used.

In another implementation, for a set of advertisement spots, e.g., a pod of several 30-second advertisement spots, each spot can be auctioned separately. In another implementation, an entire pod can be auctioned, and the highest ranked advertisements can be selected for showing during the pod. For example, if the auction illustrated above for advertisements A, B and C was conducted for a pod of two advertisement spots, commercials B and C would be selected.

In one implementation, an impression rate can be set to an initial default value, e.g., a rate equal to an aggregate impression rate for advertisements in a related demographic or targeting area, and can thereafter be modified based on historical performance.

In an implementation, the scheduler engine 124 and/or the candidate engine 126 can enforce advertisement restrictions. For example, the scheduler engine 124 and/or the candidate engine 126 can filter the advertisements to eliminate unwanted advertisements, e.g., competitive restrictions can be applied so that one advertisement cannot be placed near another advertisement of a competitor. For example, a television advertisement availability window for an advertisement spot can be generated. The advertisement availability window can be time based, e.g., five minutes, or can be advertisement based, e.g., three advertisement spots prior to the advertisement spots and three advertisement spot subsequent to the advertisement spot. Advertisements that have associated competitive restrictions that are exclusive of the competitive restrictions of the television advertisements that are selected to air during the television advertisement availability window can thus be precluded from selection for that availability window. For example, if company A and company B are direct competitors for the same product, and an advertisement slot is available for auction, an advertisement for company B may only eligible to auction if an advertisement for company A has not or will not air during the associated advertisement availability window e.g., within a predetermined number of advertisement slots or predetermined amount of time.

Frequency capping can be performed to limit the scheduling of certain advertisements based on an amount of time since the advertisement was last aired. For example, frequency values associated with the television advertisements can be recorded, e.g., the rate of showings of the advertisements per hour. If a current frequency value of an advertisement exceeds a repetition threshold, the advertisement may be precluded from being shown during advertisement availability.

Likewise, geographic data can be used to filter local advertisements. For example, the availability schedule may define an advertisement availability in San Francisco, Calif. Accordingly, targeted local advertisements that are not targeted to San Francisco, e.g., a local car dealership in Los Angeles, Calif., may be precluded from being shown during an advertisement availability for the locality of San Francisco.

Once the advertisements are selected for an advertisement availability, data related to the selected advertisements and intended display times, e.g. advertisement identifiers and corresponding time slots that the corresponding advertisements are to be shown, can be provided to the provider 160 as an advertisement schedule 404. The advertisement schedule 404 can be accessed by an inserter 172 and a modulator 174 that are utilized to insert advertisements stored in the local store 166 into a broadcast stream 176.

A verification report 406 that includes data indicating whether the advertisement aired can be provided to the provider agent 162. In one implementation, the verification report 406 includes data that indicates whether the advertisement aired, the air time of the advertisement, and the channel on which the advertisement aired. The provider agent 162 can, in turn, transmit the verification report 406 to the television advertisement scheduling and reporting system 400 for processing by the reporting engine 128 and storing in the accounting data 112. Depending on contractual obligations, e.g., whether the advertisers are billed according to impressions or are charged a flat fee, the accounting engine 130 may then charge any fees due to the corresponding advertiser account.

In another implementation, data related to actual viewings, e.g., impression data 408, such as set to box log files and reporting records, can be provided to the provider 160. The impression data 408 can, in turn, be provided to the provider agent 162 as an impression data report 410. The impression data report 410 can be provided to the reporting engine 128 for processing to determine an impression value related to the actual and/or estimate of the number of impressions. The impression value can be used by the accounting engine 130 to charge any fees due to the corresponding advertiser account.

In one implementation, the impression data 408 can be defined by viewing device 164 logs, e.g., set top box activity data, such as reporting records. For example, user activity, including channel changes and timestamps, can be recorded and provided to the provider 160 periodically, e.g., daily or weekly, in the form of logs. The logs can, for example, be processed by the reporting engine 128 so that the timestamps are correlated to the times of advertisement insertions. In one implementation, each viewing device 164 that was tuned to a broadcast stream during a time at which an advertisement was inserted is counted as an impression. Additionally, other impression data can also be determined, such as tune-in and tune-away times for partial views of an advertisement. As the log data can effectively measure impressions for tuned televisions, multiple impressions can be generated per household.

In another implementation, a caching layer 420 can be utilized to cache data related to advertisement selection and processing of advertisement requests. The caching layer 420 can, for example, be utilized to optimize performance of the auctioning process.

In one implementation, the provider agent 162 can anonymize data related to particular viewing devices 164 and account information before the data are received by the television advertising scheduling and reporting system 400. Each viewing device 164 can be represented as an anonymous entity, and account information can be associated with location information that has no more granularity than a zip code.

In another implementation, the impression data 408 can be defined by statistical measurements, e.g., by local and/or regional sampling and extrapolation to a viewership estimate, and can be provided by a third party. For example, Nielsen ratings data can be used to determine a viewership estimate and corresponding impression estimate.

In another implementation, advertisements can be targeted to video-on-demand users, digital video recorder users, and the like. Accordingly, the advertisement scheduling data 404 can include real time or near real time requests.

Figure 5:
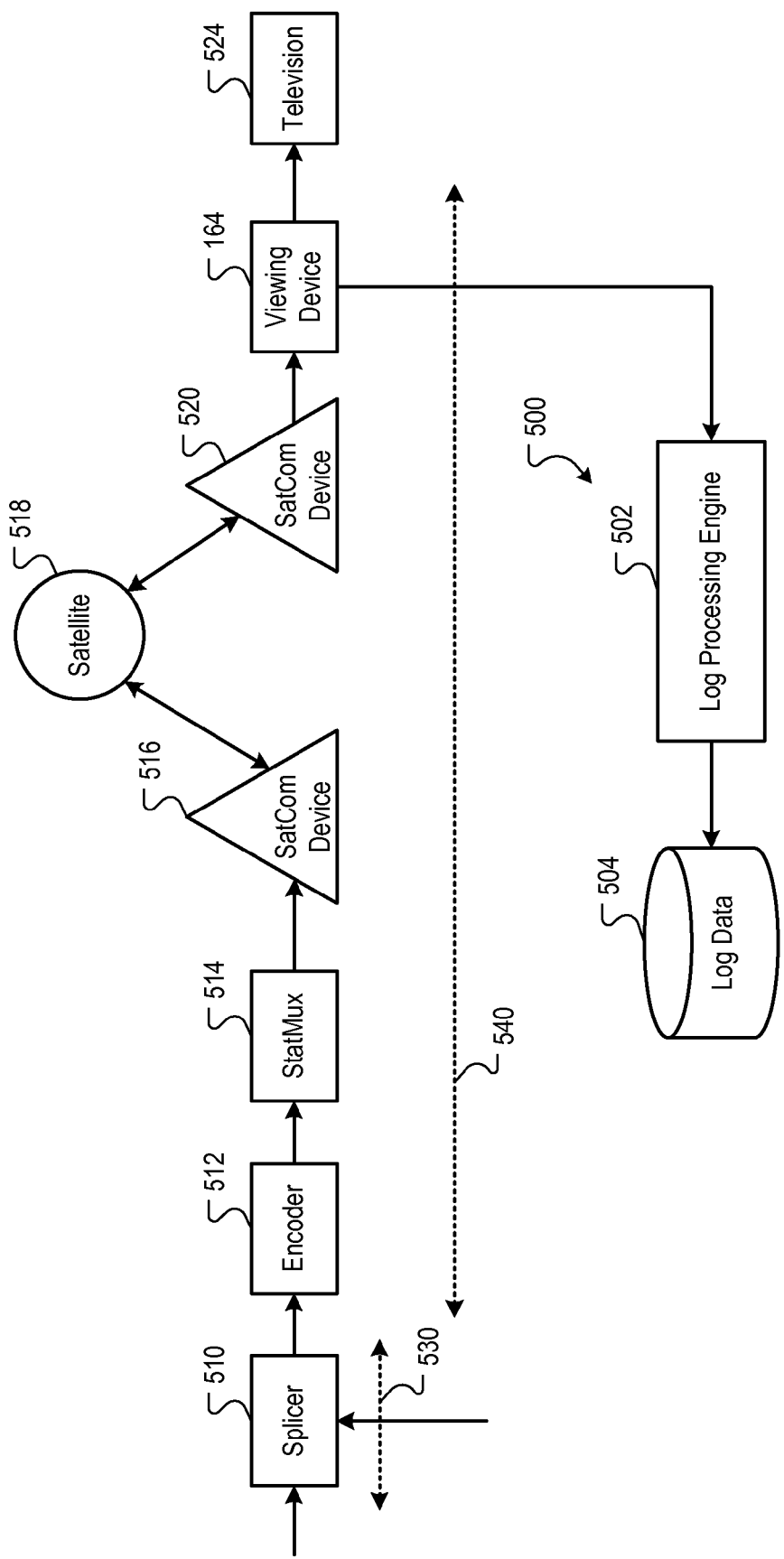
FIG. 5 is an environment for an example log processing system.

FIG. 5 is an environment for an example log processing system. A log processing engine 502 can receive logs, such as reporting records, from viewing devices 164, e.g., set to boxes, digital video recorders, etc., and process the logs to determine the audience of particular advertisements and infer information about the quality of the advertisements, e.g. performance of advertisements as measured by impressions.

The viewing devices 164 can, for example, provide log files that record the key presses and channel tunes that the viewing devices 164 have received over a time period, e.g., typically one week. The log data can also include reporting data, e.g., reporting records, that identifies channel tunes, e.g., a channel identifier to which the viewing device was tuned, and channel tune times, e.g., the times that the viewing device was tuned to a channel. However, due to processing delays, the log files of the viewing devices 164 may not identify the same time indexes for a given airtime. For example, in a broadcast system, an analog splicer 510 that inserts video frames into a broadcast may have a first time delay 530. Likewise, a second time delay 540 may be inherent in a broadcast system having an encoder 512, a statistical time division mulitplexor (statmux) 514, a transmitting satellite communication device 516, a satellite 518, a receiving satellite communication device 520, and a viewing device 164. The time delay 530 and 540 can, for example, be modeled based on particular hardware manufactures. Typically the statmux 514 inserts a terrestrial dynamical timestamp (TDT), and thus the time logs on the viewing devices 164 will vary by the satellite transmission times.

Other delays can also be identified. For example, advertisements inserted at different locations, e.g., at a head end in New York and at a head end in Los Angeles; or at a root feed in New York and at a local re-broadcaster, can be identified. For example, a first delay time may be identified for a nationwide broadcast of a commercial at an east coast time slot of 20:37:00, and a second delay time may be identified for the nationwide broadcast of the commercial at a west coast time slot of 20:37:00 that same evening.

In some implementations, the tune acquisition time for the television processing device, e.g., a set top box, can also be modeled. The tune acquisition time determines how long after a tune is reported before a television processing device can actually start rendering the content, and can be device-dependent and/or stream-dependent. For example, a device-dependent parameter may include the average time or longest time necessary for a device to lock to a particular frequency; a stream-dependent parameter may include the average time or the longest time for stream to be decoded so that a television can begin displaying content. Theses parameters can, for example, be dependent on the encoding properties of the stream and on the television processing device model. For example, a first brand of set top boxes may have an average tune time acquisition of 550 milliseconds; a second brand of set top boxes may have an average tune time acquisition of 300 milliseconds, etc.

Once the logs for the viewing devices are received, e.g., such as the impression data 408 received in FIG. 4, the log processing engine 502 adjusts the time stamps to take into account the various delays in the service, for example, between splicing and display. The resulting normalized log data 504 are analyzed to determine the quality of the advertisements, e.g., what percentage of people view the advertisement to the end, what is the median tune-out time, average view length etc. For example, the log processing engine 502 may determine that an advertisement was viewed if, at a time index corresponding to the completion of the advertisement, the channel was changed, thus indicating that the viewer watched the advertisement before changing the channel. Conversely, the log processing engine 502 may determine that an advertisement was not viewed if, at a time index corresponding to the beginning of the advertisement, the channel was changed, thus indicating that the viewer changed the channel when the advertisement was aired.

Additionally, the log processing engine 502 may detect "false positives," e.g., indications that an advertisement was viewed when, in fact, it is highly likely that the advertisement was not viewed. For example, if the log data 504 for an anonymized log indicates that a viewer changed channels often until 10:14 PM, and then did not change the channel for the remainder of the evening, the log processing engine 502 may determine that no advertisements were watched by the viewer after 10:30 PM, as the viewer may have fallen asleep or stopped watching the television. In one implementation, the log processing engine 502 may apply a timeout period of one hour for viewing device 164 events. If a viewing device 164 event does not occur during the time out period, then it is likely that a viewer is no longer watching the television 524. Other false positive detection algorithms can also be used, such as the detection of automatically generated channel tune events that can be indicative of channel tunes generated by video recording devices; variable dwell times based on networks and local time of day; channel change behavior on an anonymized device basis; etc.

An example process that can be implemented in the log processing engine 502 can be as follows. Log files (e.g., set top box log files, digital video recorder files, etc.) are copied from a provider, such as the provider 160, to a local file system accessible by the log processing engine 502. An adjustment process identifies the viewing device 164 events and adjusts the timestamps to take into account the various delays in the service, e.g., between splicing and display. False positive detection processing can account for false positives by analyzing the event stream for each viewing device. The viewing device events that are reliable events are utilized to identify advertisement viewings. An impressions processor utilizes the reliable events and insertion records identifying when advertisements were inserted on particular channels to determine viewership impressions. The number of reporting set top boxes can be utilized to extrapolate (or project) the viewership of a particular advertisement if less than all the viewing device 164 logs are received. Other metrics can also be calculated, e.g., median tune-out time, percentage of viewers viewing an advertisement to an end, average viewing time for each advertisement, etc.

Figure 6A:
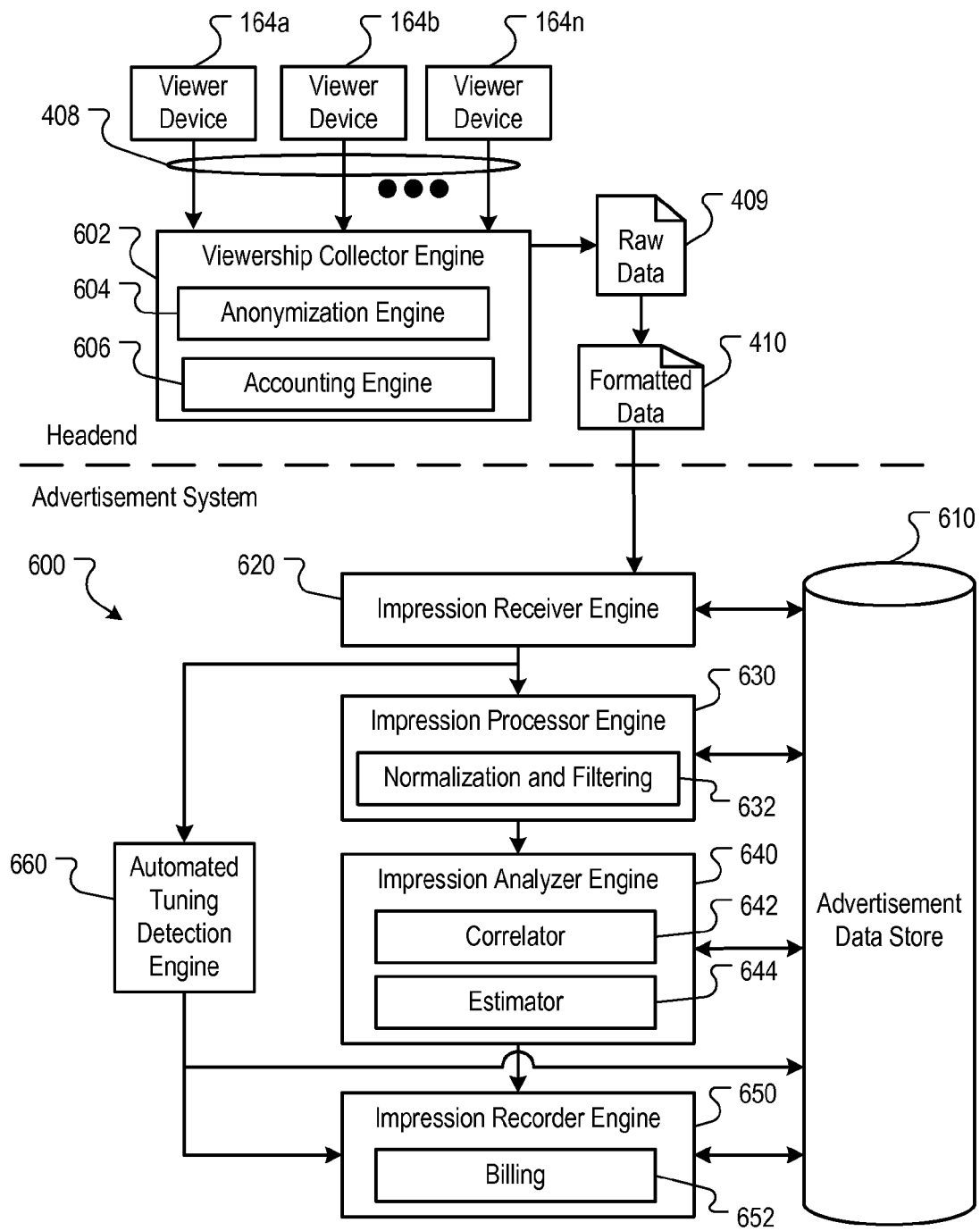
FIG. 6A is an example implementation of a log processing system in a television advertising system.

FIG. 6A is an example implementation of a log processing system 600 in a television advertising system. The log processing system 600 can, for example, be implemented in the advertisement system 100 of FIG. 1 or in the log processing system of FIG. 5.

In an implementation, impression data 408, e.g., reporting data, set top logs, or other data that describes television processing device activity, can be provided to a viewership collector engine 602. The viewership collector engine 602 can, for example, be implemented in the provider agent 162, or can be software and/or hardware provided by the provider 160. The impression data 408 can identify channel tunes and corresponding tune times for each viewing device, and can also include other data, such as key press logs, etc.

An anonymization engine 604 can, for example, be utilized to remove any personal identifiable information, and reduce granularity to a particular region, e.g., a zip code, or city, etc. An accounting engine 604 can provide anonymized account data, e.g., a non-identifiable account profile associated with each set of log data from each viewing device 164. Example anonymized account data can include a subscriber package detail, e.g., premium provider package, basic provider package, etc.; a list of authorized channels; viewer device 164 population data; channel map data, etc.

The anonymized data can be stored as a raw data 409. Example formats for the raw data include comma separated value/pipe-delimited data files, or some other data file of a particular format. The raw data file 409 can, for example, be converted into a formatted data file, such as records in an impression data report 410, and provided to an impression receiver engine 620. Format conversion can, for example, be implemented at the provider 160, e.g., by the provider agent 162, or can be implemented at the location of the log processing system 600.

An impression receiver engine 620 can, for example, receive the reporting data from the television provider 160, e.g., the impression data report 410, and any other data provided by the television provider 160, e.g., programming schedules, etc. The reporting data can include for example, records that define channel identifiers, associated tuning events and associated tuning times reported by television processing device, e.g., viewer devices 164. Other data can also be provided to the impression receiver engine 620, such as television provider 160 data including insertion times and intended display times of television advertisements.

The received data 410 can, for example, be stored in a data store 610. In one implementation, the data store 610 can include one or more of the advertisement data store 102, advertisement parameter store 104, log data store 106, performance data store 108, out of band data store 110, and the accounting data store 112.

The impression processor engine 630 can receive the reporting records from the impression receiver engine 620 and execute a normalization and filtering engine 632 to adjust the associated tuning times for television processing delays and to identify reliable reporting records and false-positive reporting records.

Normalization can, for example, adjust the associated tuning times to compensate for television processing latency, e.g., signal delivery and tuning latency. Given a raw reporting record from a provider and various metadata about the provider's broadcasting schedule and processing equipment, the impression processor engine 630 resolves latency issues between an insertion time, an intended display time, and/or an actual broadcast time. In one implementation, the impression processor engine 630 can, for example, also match the channel identifiers of tuning events reported by the viewer devices 164 with provider programming data to normalize to a globally unique stream of identifiers. For example, an input to the impression processor engine 630 may be a reporting record defining the following channel tune and tune times for a particular viewing device:

V_ID00001111:Channel=123.Start=4:05:00 pm.end=4:06:00 pm where V_ID00001111 is an anonymized viewing device 164 identifier, Channel is a channel identifier, Start is a first tune time indicating when the viewing device 164 tuned to the channel identified by the channel identifier, and End is a second tune time indicating when the viewing device 164 tuned out of the channel identified by the channel identifier. The impression processor engine 630 can generate the following example normalized reporting record:

V_ID00001111:
OperatorID=1243.HeadendID=22.InsertionZone=243.
InsertionID=53432934.Channel=123.Start=4:04:52
pm.End=4:05:52 pm where the additional fields OperatorID, HeadendID, and InsertionZone are identifiers related to a particular operator 160 and corresponding geographic location, and the InsertionID is an advertisement identifier. The corresponding tune times in the normalized reporting record can likewise be adjusted to compensate for television processing latency.

In an implementation, the tune times can be adjusted according to a fixed delay and a variable delay. The fixed delay can be based on television provider encoder hardware and software, or other system implementations having a known delay. The variable delay can be based on television provider equipment that may have variable delays, e.g., analog mixers, encoding changes, etc.

Different latency delays can be determined. For example, the latency delay can be defined as the time between an insertion time of a television advertisement at the television provider and an actual display time of the television advertisement at a viewing device. In another implementation, the latency delay can be defined as the time between an intended display time of a television advertisement and an actual display time of the television advertisement at a viewing device. Other latency measurements can also be used.

In one implementation, processing latency adjustments can include corresponding error estimates if an adjustment uncertainty exists. In one implementation, the impression processor engine 630 can also generate original reporting records from the normalized reporting records.

The impression process engine 630 can, for example, also filter the normalized reporting records according to one or more filtering rules to identify reliable normalized reporting records and false-positive normalized reporting records. For example, the data related to the intended display times, insertion times, and actual display times can be compared to one or more filtering rules, such as dwell time filtering, idle filtering, and authorization filtering.

Dwell time filtering can, for example, determine if corresponding tune times for a channel tune define a duration exceeding a minimum dwell time threshold, and upon a positive determination, associate the corresponding tune times for the channel tune as a reliable duration. For example, if a user is channel surfing, the user may generate many tuning events that do not correspond to having genuinely paid attention to the channel, and therefore not paid attention to an advertisement that may have aired. If the dwell time of any viewing is less than a certain dwell time threshold, e.g., two seconds, five seconds, etc., the channel tunes can be considered a channel surfing event in which the user did not pay attention to the advertisement, and thus an impression would not be generated.

Other log data, such as key presses, can also be used to identify channel surfing and define dwell times. For example, the entering of a channel number manually may be a weak indicator of channel surfing, which the repetitive actuation of an up or down channel key may be a strong indicator of channel surfing. In one implementation, a dwell time threshold can be adjusted depending on a user behavior. For example, a dwell time of 15 seconds may be imposed in a non-channel surfing context; however, the dwell time can be reduced to 10 seconds during a channel surfing context.

In some implementations, log data can be processed to determine if multiple channel tunes occurred simultaneously, and impressions and/or costs associated with one or each of the simultaneous channel tunes can be adjusted or ignored. For example, log data may indicate that the television processing device was tuned to two channels simultaneously, e.g., a "picture-in-picture" operation. In these implementations, the reporting records for one (e.g., the main channel tune or the "picture-in-picture" channel tune) can be identified as false-positive reporting records.

Idle filtering can, for example, determine if corresponding tune times for a channel tune define a duration that exceeds a maximum dwell time threshold, and upon a positive determination, associate the corresponding tune times for the channel tune as a false-positive duration. For example, common usage patterns are turning off a television while leaving viewing device 164 on, leaving a room for an extended time while the television remains on; and falling asleep during a television program. Consequently, a record of viewer events that indicates a user watching the same channel for an extended time without changing the channel, e.g., four hours, may generate many false positive impressions, as the viewer may have turned off the television, left the room, or fallen asleep.

In some implementation, idle filtering parameters can, for example, be adjusted based on a corresponding programming event. For example, a maximum dwell time threshold can be set in substantial proportion to a programming event, e.g., a 30 minute programming event can have a maximum dwell time of 30 minutes; a three hour sporting event can have a maximum dwell time of three hours, etc. In another implementation, the maximum dwell time threshold can be adjusted based on an aggregate length of programming events. For example, four 30 minute programming events may have a corresponding maximum dwell time of 45 minutes. Thus, if during a broadcast of four half-hour sitcoms the viewing device 164 does not indicate a channel tune change, impressions will not be generated for viewings beyond the initial 45 minute dwell time.

In another implementation, idle filtering can be adjusted based on viewer behavior during previous programming. For example, idle history times can be based on viewer behavior collected over time, e.g., an idle filter time for a first program or program content (e.g., television news talk programs) may be 15 minutes; while an idle history time for a second program or program content (e.g., a three hour long program) may be two hours based on historical viewer behavior.

Authorization filtering, can, for example, determine if a channel tune is an authorized channel tune, e.g., a channel to which a user is subscribed. If the channel tune is not an authorized channel tune, then authorization filtering can preclude association of the corresponding tune times for the channel tune as a reliable duration. For example, if a user has not subscribed to the channel tuned, it is unlikely the user could have viewed the advertisement placed on that channel.

An impression analyzer engine 640 can be configured to receive the normalized reporting records from the impression processor engine 630. In an implementation, the impression analyzer engine 640 can implement a correlation engine 642 to correlate the reliable normalized reporting records with advertisement insertion records to determine reported impressions for corresponding television advertisements. For example, the impression analyzer engine 640 can correlate reliable durations with the advertisement schedule 404 defining advertisement insertion records previously provided to the television provider 160. Accordingly, reliable normalized reporting records that include channel tunes and tune times that indicate a viewing device 164 displayed the advertisement during a reliable duration can correspond to an impression for the advertisement.

Typically, all viewing devices 164 will not have reported for a given time period, e.g., the entire corpus of viewing devices 164 can provide log data at different times. Accordingly, the true total number of actual impressions may not be exactly measured until all viewing device 164 have reported for a given time period. Thus, at any one time it is likely only a subset of all viewing devices 164 have provided log data to the log processing system 600. Accordingly, an estimation engine 644 can, for example, estimate the projected impressions for the corresponding television advertisements based on the reported impressions.

In one implementation, the estimation engine 644 of the impression analyzer engine 640 can determine a percentage of a maximum number of reporting records received. For example, if a television provider has 100,000 subscriber viewing devices, and 50% of the viewing devices have provided log data for a Monday afternoon time slot, then the percentage of a maximum number of reporting records received is 50%.

The percentage of reporting records received can define a sample weighting, and the sample weighting can be adjusted for a sample bias. For example, the estimation engine 644 can thus estimate the projected impressions for the corresponding television advertisements based on percentage of the maximum number of reporting records and the reported impressions for the corresponding television advertisements. In one implementation, the estimate can, for example, be a linear extrapolation. For example, if the reported 50% of all available reporting records received yield 2,100 impressions for an advertisement aired during a particular advertisement availability, then the projected impressions can be 4,200.

As reporting records are likely to be received from the provider 160 over a period of several days, or even weeks, the impression processor engine 630 and the impression analyzer engine 640 can, for example, iteratively process newly arrived reporting records. In one implementation, the impression processor engine 630 and the impression analyzer engine 640 are configured to iteratively update the projected impressions during an impression time window. The iterative updates can, for example, be based on subsequently received reporting records from the television provider 160 during the impression time window. In one implementation, the impression time window can be approximately one week.

After each iteration, an error value related to the projected impressions can be calculated. Typically, as the number of log records processed for a given advertisement availability increases, the error value decreases. In an implementation, an advertiser's account may only be charged upon the occurrence of the error value decreasing below a threshold value, or upon the expiration of the impression time window.

A reporting recorder engine 650 can, for example, store the impression data related to advertisements in the data store 610. For example, the reporting recorder engine 650 an update performance data related to an advertisement, which can, in turn, affect the quality score of the advertisement and future selections of the advertisement. In one implementation, the impression recorder engine 650 can also implement a billing process 652, e.g., a call to the accounting engine 130, which can generate corresponding advertiser billings.

In another implementation, false-positive detection can be identified from original reporting records, i.e., non-normalized reporting records. For example, an automated tuning detection engine 660 can receive reporting records from the impression receiver engine 620, identify reported channel tunes and corresponding tune times of the television processing devices from the reporting records, and identify automatically generated channel tunes based on the corresponding tune times.

For example, reporting records can be processed by the automated tuning detection engine 660 to distinguish between viewer-triggered channel tunes and automatically generated channel tunes. The automatically generated channel tunes can, for example, be indicative of a recording device tuning to a channel to record a program. For such channel tune characteristics, it is more likely that a viewer is not present to watch the program during the actual broadcast time. Depending on other viewer-triggered channel tunes and/or other viewer triggered data proximate in time in to the identified automatically generated channel tunes, advertisement costs, e.g., costs per action, can be discounted, delayed or even waived with respect to a television processing device for which advertisements aired on a channel that was tuned to by an automated channel tune.

Viewer-triggered channel tunes can be differentiated from automatically generated channel tunes based on viewer reaction times. While both tuning types tend to cluster together at certain times, e.g., at the start and end of programming events, tune times for viewer-triggered channel tunes are loosely correlated relative to the correlation of tune times for automatically generated channel tunes.

Additionally, a period of inactivity at the television processing device and/or at a control device associated with the television processing device, e.g., a set top box digital video recorder (DVR) remote control, can define a dwell time that can be used to further determine whether a viewer was present to watch a program during the actual broadcast time. For example, if the television processing device does not process viewer-input television processing device commands, e.g., channel tunes, volume adjustments, menu key presses, other inputs indicating a viewer presence, the likelihood that a viewer was present to watch the program during the actual broadcast time decreases.

Figure 6B:
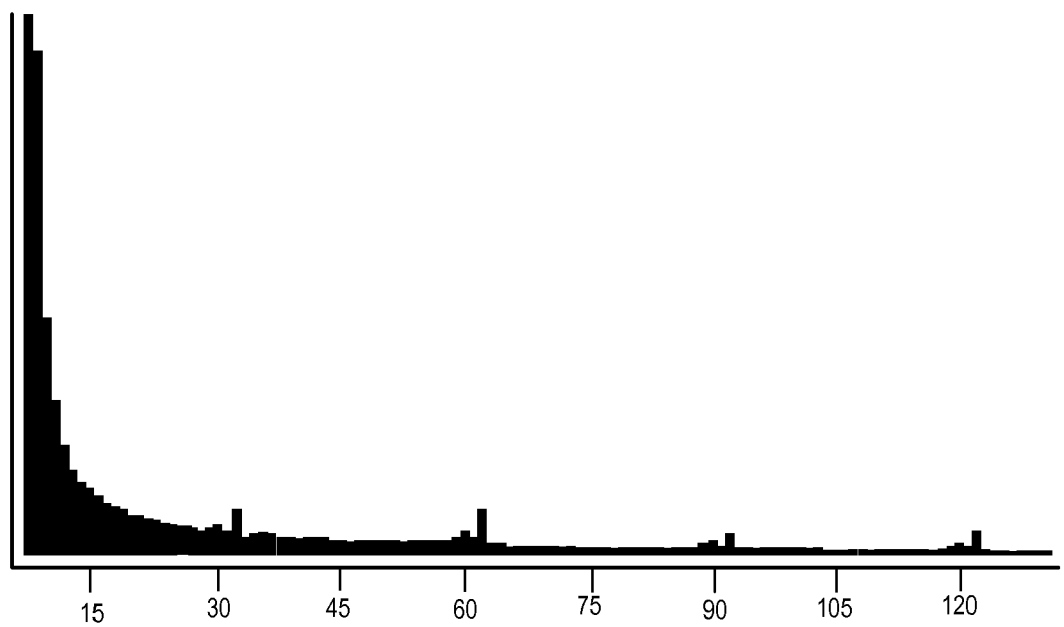
FIGS. 6B-6D are example dwell time plots.
Figure 6C:
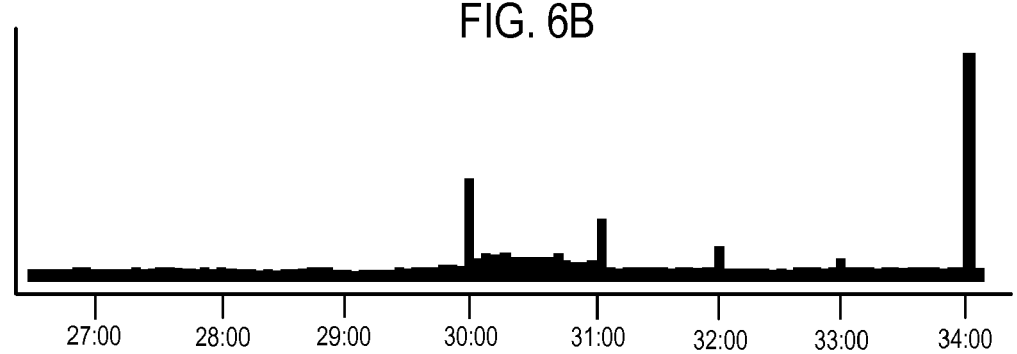
Figure 6D:
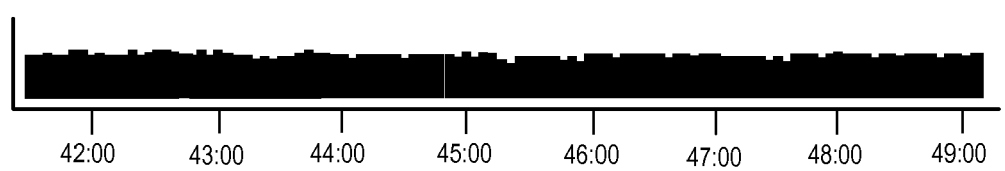

FIGS. 6B-6E illustrate the dwell time plots that indicate channel tunes that are likely to be automatically generated by a television processing device. FIGS. 6B-6D are example dwell time plots indicating dwell times for television processing devices over a time period, e.g., one week. In the plots of FIGS. 6B-6D, the dwell times measure channel tune outs, e.g., a set top box that remains tuned to a particular channel for 60 minutes and is then tuned to another channel would define a dwell time interval of 60 minutes.

As illustrated in FIG. 6B, the dwell times tend to decay at an exponential rate. Because, however, many programs are broadcast in increments of 30 minutes, a relatively large number of channel tunes are distributed at tune times near the end of each 30 minute increment, creating dwell time clusters. Thus at certain dwell times, such as 30, 60, 90 and 120 minutes, the occurrence of dwell times increase. For example, near the actual durations of 30, 60, 90 and 120 minutes, the number of dwell times can have a Gaussian distribution, or a distribution similar to a Gaussian distribution. Furthermore, many channel tunes occur at characteristic dwell times, e.g., exactly at 30:00, or 31:00, 32:00, etc. These channel tunes are likely to be composed of automatic channel tunes, as such characteristic times are likely indicative of users programming a recording device to stop recording exactly at a program end time, or to extend beyond a program end time by up to several minutes to ensure that the entire program is recorded. These characteristic dwell time are also indicative of a default padding time implemented in a recording device.

FIG. 6C is a more detailed dwell time plot for dwell time periods of 27-34 minutes at a dwell bin resolution of 4 seconds. The dwell times of 30:00, 31:00, 32:00, 33:00 and 34:00 have significant proportional increases relative to prior and subsequent dwell times, e.g., dwell times of 29:56 and 30:04; 30:56 and 31:04, etc. Discretizing the dwells times to a finer dwell time bin size, e.g., 1 second, can further emphasize the proportional gain at the characteristic times of 30:00, 31:00, 32:00, 33:00 and 34:00. The relatively flat increase in dwell times between the times of 30:00 and 31:00 can be attributed to viewer-triggered channel tunes.

FIG. 6D is a more detailed dwell time plot for dwell time periods of 42:00-49:00 minutes at a dwell bin resolution of 4 seconds. The dwell times remain relatively flat, indicative of viewer-triggered channel tunes. Such a flat distribution is expected over this period, as automatically generated channel tunes would be less likely to occur at these dwell times.

Figure 6E:
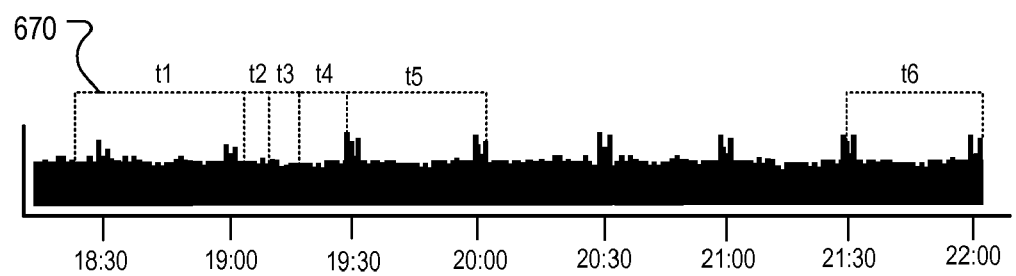
FIG. 6E is an example plot of channel tunes during a broadcast time period.

FIG. 6E is an example plot of channel tunes during a broadcast time period from the hours of 18:30-22:00. The plot of channel tunes illustrate highly correlated channel tune clusters at characteristic tune times, e.g., 18:59, 19:00, 19:01, 19:29, 19:30, 19:31, etc. A line pattern 670 corresponds to channel tunes defined by reporting data for a particular set top box and the resultant dwell times t1-t6. The corresponding channel tunes and tune times related to the line pattern 670 are provided in Table 1 below:

TABLE 1

| Dwell Period | Channel ID | Tune In/On | Tune Out/Off | Dwell Time |
| --- | --- | --- | --- | --- |
| t1 | 33 | 18:27:02 | 19:02:11 | 35:09 |
| t2 | 36 | 19:02:11 | 19:09:12 | 7:01 |
| t3 | 51 | 19:09:12 | 19:20:34 | 11:22 |
| t4 | 11 | 19:20:34 | 19:29:00 | 8:26 |
| t5 | 124 | 19:29:00 | 20:01:00 | 32:00 |
| t6 | 8 | 21:29:00 | 22:01:00 | 32:00 |

The channel tunes and tune times listed in Table 1 above and illustrated in FIG. 6E for a particular set top box can be interpreted as evidencing viewer-triggered channel tunes during the dwell time periods t1, t2, t3 and t4, as these dwell times are random and correspond to tune times independent of characteristic tune times. However, the channel tunes during the dwell periods t5 and t6 can be interpreted as automatically generated channel tunes, as these channel tunes occur at corresponding channel tune cluster pairs and define dwell times that have significant proportional increases relative to prior and subsequent dwell times, e.g., 32 minutes.

Other dwell time or tune time characteristics can also be used. For example, the dwell time of 32 minutes can be contingent of the observed behavior of a viewing populace. In some implementations, a default behavior of a television processing device can also be used to identify automatically generated channel tunes, e.g., a particular television provider may have set top boxes with DVR capability that by default begin two minutes before a scheduled electronic program guide start time and extend five minutes beyond a scheduled electronic program guide end time and.

In one implementation, an advertising cost for an advertisement that aired on the channel defined by the channel tune and during a time period defined by channel tune cluster pairs, e.g., the broadcast time periods defined by the dwell times t5 or t6, can be discounted. The discount can, for example be adjusted based on a likelihood that a viewer watched the program being recorded during the actual airtime. The likelihood can be based on, for example, the proximity in time of channel tunes that are unassociated with the automatically generated channel tunes. For example, the channel tunes for dwell periods t1-t4 are proximate in time to dwell period t5, thus indicating viewer interactions and therefore a viewer presence at the beginning the dwell period t5. Accordingly, only a small discount may be applied to an advertising cost, or even no discount may be applied.

The channel tunes for dwell periods t1-t4, however, are not proximate in time to the dwell period t6, thus indicating a viewer was not present at the beginning of the dwell period t6. Accordingly, a full discount may be applied to an advertising cost, or the advertisement cost can be waived in its entirety with respect to the particular television processing device, i.e., the impression is identified as a false positive and processed as described above. Other discounts can also be applied, e.g., a discount can be applied in substantial proportion to the length of the dwell time.

In some implementations, the automated tuning detection engine 660 can identify false-positive impressions based on the channel tune clusters at corresponding tune times. Based on the behavior model describe above, the automated tuning detection engine 660 can also identify the channel tune clusters as automatically generated channel tunes. For example, the automated tuning detection engine 660 can identify dwell time counts for television processing devices from the reporting data to generate the data of FIG. 6C defining in a dwell time count relative to adjacent dwell time counts exceeds a threshold, e.g., 3 dB, or some other threshold measure. If the threshold is exceeded, the channel tune cluster can be identified automatically generated channel tunes. For example, the channel tunes at the dwell times of 30:00, 31:00, 32:00, 33:00 and 34:00 can be identified as automatically generated channel tunes, while the channel tunes at the times 29:32, 31:07, etc. are not identified as automatically generated channel tunes.

In some implementations, the automated tuning detection engine 660 can determine if channel tunes related to a television processing device, e.g., a set top box DVR, correspond to a channel tune cluster pair. If the automated tuning detection engine 660 determines that the channel tunes related to the television processing device correspond to a channel tune cluster pair, then the accounting engine 130 can discount an advertising cost for an advertisement that aired on the channel defined by the channel tune and during a time period defined by the channel tune cluster pairs. The discount can, for example, be adjusted in substantial proportion to a length of the time period defined by the channel tune cluster pair, or can be adjusted in substantially inverse proportion to the proximity in time of unassociated channel tunes to the time period defined by the channel tune cluster pair. Other advertising cost adjustment or delayed billing schemes can also be used.

In another implementation, the automated tuning detection engine 660 can identify false-positive impressions based on identifying channel tunes occurring at channel tune times that correspond to triggering tune times. The triggering tune times can, for example, be tune times that are often utilized by automated recording devices, such as programming start times and end times for television programs, or rounded time values, e.g., 18:29:00, 18:30:00, 18:31:00, etc. In some implementations, different sets of triggering tune times can be compared to increase the accuracy of identifying false-positives impressions. For example, a rounded time value of 18:30:00 can correspond to a program start time and/or end time, while a rounded time value of 18:21:00 does not correspond to a program start or end time. Accordingly, channel tunes occurring at the tune time of 18:30:00 may be determined to be automatically generated, while channel tunes occurring at the tune time of 18:21:00 may not be determined to be automatically generated.

In some implementations, the automated tuning detection engine 660 can store a list of the start and end times of programs defined in electronic program guide data, and can store data related to characteristic padding schemes used by the television processing device. Example padding schemes can include starting a recording operation to record a program one minute before the program start time if there is no recording preceding that time; stopping three minutes after the program end time if there is no recording scheduled within the three minutes after the program end time; continuing to record for 30 minutes beyond the program end time if the program is a sporting event, etc. The automated tuning detection engine 660 can analyze reporting records to identify channel tune times that start at a characteristic time before a program start time, and which end at a characteristic time after the program end time.

In some implementations, electronic programming guide data can be delivered out of band as static data, e.g., data related to regularly scheduled television events. Alternatively, the electronic programming guide data can be delivered from monitoring the data stream recorded by the television processing device, e.g., digital video broadcasting in-band delivery of electronic programming guide data. The in-band electronic programming guide data can facilitate the processing of information for live sporting events that can have unpredictable ending times. For example, a "program over" signal delivery may be delayed for delivery in-band if a sporting event goes into double overtime. Accordingly, a large number of channel tunes may be automatically generated at an unexpected dwell time or broadcast time, e.g., the sporting event may air from 7:30 PM to 11:43:19, resulting in channel tune clusters at 7:29:00 and at 11:45:19.

In some implementations, the automated tuning detection engine 660 can identify tune in and tune out channel tunes at tune times that are shared by a larger population of television processing devices than would be expected by random chance. If this correlated behavior is sufficiently more frequent than a random occurrence, e.g., 10× more correlated than channel tunes at proximate tune times, then the channel tunes at the matching tune times can be indicative of an event that has been manually scheduled by individuals independent normal programming schedules. In some implementations, such identification can be implemented without electronic programming guide data.

In some implementations, the automated tuning detection engine 660 can identify channel tune times that start at a characteristic time before or after rounded time values e.g., 0, 15, 30 and 45 minutes after the hour, and identify channel tune clusters, should such channel tune clusters be identified, as manually-programmed triggering tune times. If such a channel tune cluster exhibits a high correlation relative to the preceding and subsequent channel tunes, then the channel tune cluster can be identified as automatically generated channel tunes.

Once the automated tuning detection engine 660 identifies reporting records that are indicative of automatically generated channel tunes, e.g., channel tunes likely to be triggered by a DVR timer, the accounting engine 130 can optionally adjust an advertising cost for advertisements that were likely recorded. In one implementation, the advertisement cost adjustment can be applied on a per-device basis, e.g., the impression associated with the television processing device can be identified as a false-positive and not accounted for.

In another implementation, the accounting engine 130 can apply a prorated billing based on overall data, e.g. if a viewer survey or corresponding data analysis finds that 40% of advertisements in recorded programs are skipped during playback, the advertisement cost can be reduced by 40%.

In another implementation, the accounting engine 130 can adjust the advertising cost in substantial proportion to the length of the dwell time. For example, an automatically generated dwell time of three hours can be discounted more than an automatically generated dwell time of 30 minutes.

The impression receiver engine 620, the impression processor engine 630, the impression analyzer engine 640, the impression recorder engine 650, and the automated tuning detection engine 660 can be implemented separately or in combination. For example, in one implementation, the impression receiver engine 620 can be integrated into the impression processor engine 630 on a computing device. Other combinations and/or subcombinations can also be used.

In another implementation, the automated tuning detection engine 660 can process the distribution of behavior of viewers tuning in just before and just after the automatically generate channel tune, and estimate, e.g., interpolate, a value coincidental user tunes, e.g., "background" channel tunes. The coincidental user tunes can be excluded from false positive estimates. Table 2 below lists example channel tunes proximate in time to 29:00.

TABLE 2

| Time | Channel Tunes |
|---|---|
| 28:57 | 230 |
| 28:58 | 232 |
| 28:59 | 231 |
| 29:00 | 2230 |
| 29:01 | 231 |
| 29:02 | 229 |
| 29:03 | 230 |

Based on the distribution, the automated tuning detection engine 660 can, for example, estimate that 2,000 channel tunes were automatically generated at the time 29:00, e.g., 2230-230.

As described above, the automated tuning detection engine 660 can process reporting records from television processing devices, e.g., set top boxes, DVRs, etc., and identify reporting records that correspond to a signature of an automatically-triggered channel tuning event, e.g., highly correlated channel tunes or channel tune clusters; channel tune clusters at points corresponding to the beginning and end of programs appearing in electronic program guides; or channel tune clusters corresponding to round numbers relative to a time reference. These identified channel tunes can thus be differentiated from viewer-triggered channel tunes.

Figure 7:
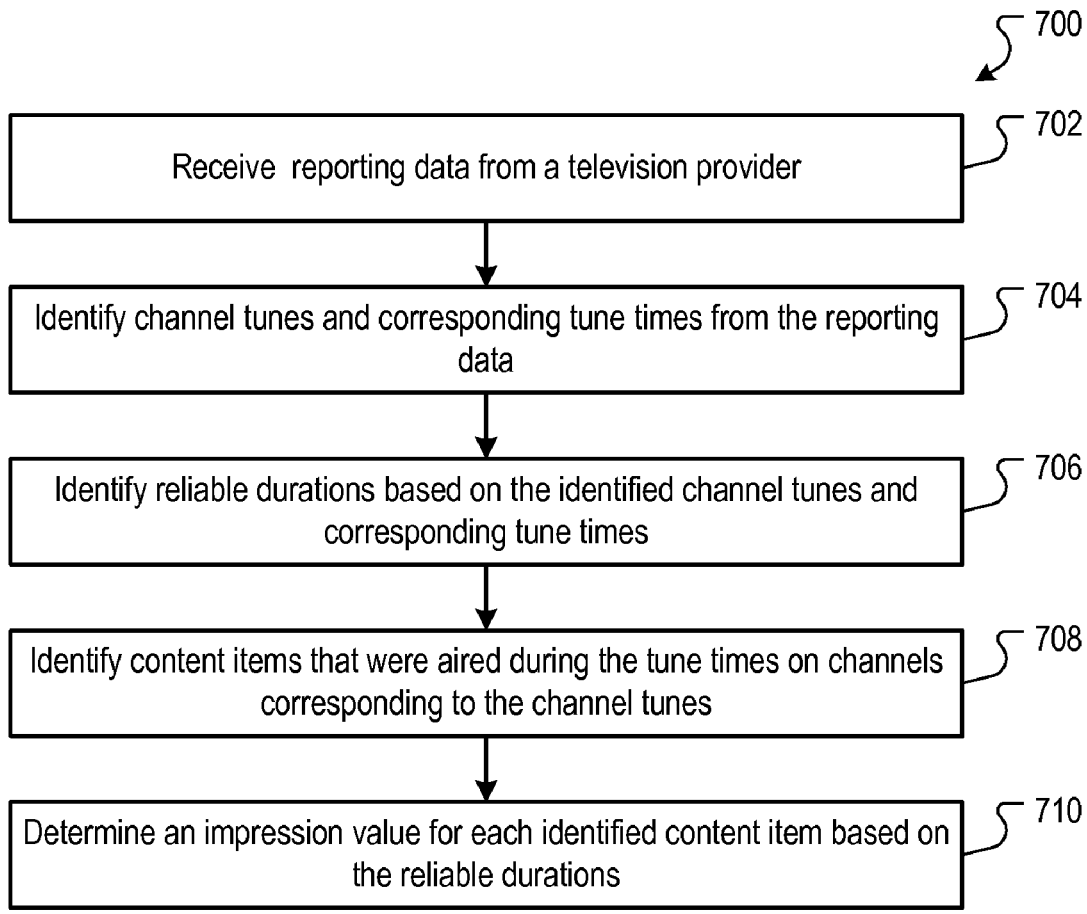
FIG. 7 is a flow diagram of an example process for processing logs and determining impressions from the processed logs.

FIG. 7 is a flow diagram of an example process 700 for processing logs and determining impressions from the processed logs. The process 700 can, for example, be implemented in the television advertising system 100 of FIG. 1, or in the log processing system 500 of FIG. 5, or in the log processing system 600 of FIG. 6A.

Stage 702 receives reporting data, e.g., from a television provider. For example, the reporting engine 128 of FIG. 1, the log processing engine 502 of FIG. 5, or the impression receiver engine 620 and/or the impression processor engine 630 of FIG. 6A can receive reporting data, e.g., an impression data report 410, from a provider 160.

Stage 704 identifies channel tunes and corresponding tune times from the reporting data. For example, the reporting engine 128 of FIG. 1, the log processing engine 502 of FIG. 5, or the impression receiver engine 620 and/or the impression processor engine 630 of FIG. 6A can identify channel tunes and correspond tune times from the reporting data.

Stage 706 identifies reliable durations based on the identified channel tunes and corresponding tune times. For example, the reporting engine 128 of FIG. 1, the log processing engine 502 of FIG. 5, or the impression receiver engine 620 and/or the impression processor engine 630 of FIG. 6A can detect reliable durations by comparing the reporting records to evaluation criteria, such as dwell times, idle times, and authorized channels.

Stage 708 identifies content items including, for example, television advertisements that were aired during the tune times on channels corresponding to the channel tunes. For example, the reporting engine 128 of FIG. 1, the log processing engine 502 of FIG. 5, or the impression analyzer engine 640 can compare the reliable durations to an advertisement schedule 404 defining advertisement insertion records to identify television advertisements that were aired during reliable durations.

Stage 710 determines an impression value for each identified content item, e.g., television advertisement, based on the reliable durations. For example, the reporting engine 128 of FIG. 1, the log processing engine 502 of FIG. 5, or the impression receiver engine 620 and/or the impression processor engine 630 of FIG. 6A can generate an impression value for each identified television advertisement that aired on a channel tune during a reliable duration for that channel tune.

Figure 8:
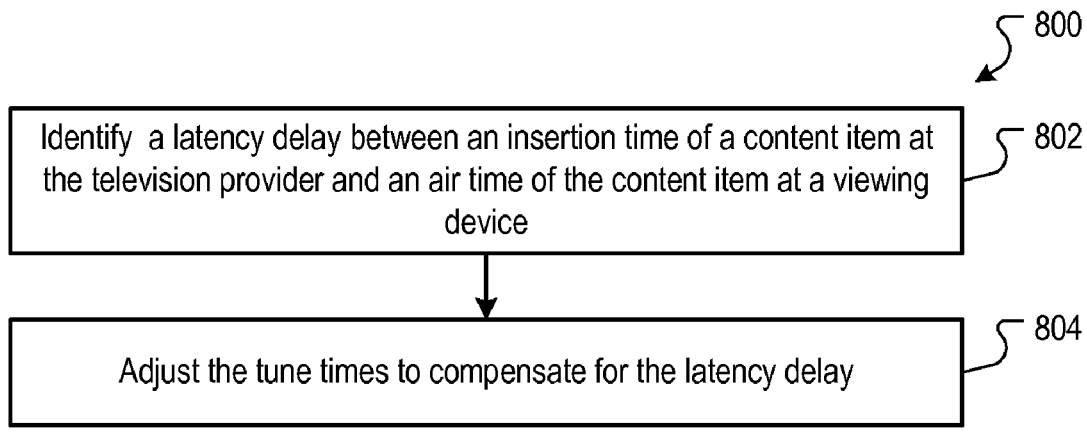
FIG. 8 is a flow diagram of an example process for adjusting log data to compensate for broadcast delays.

FIG. 8 is a flow diagram of an example process for adjusting log data to compensate for broadcast delays. The process 800 can, for example, be implemented in the television advertising system 100 of FIG. 1, or in the log processing system 500 of FIG. 5, or in the log processing system 600 of FIG. 6A.

Stage 802 identifies a latency delay between an insertion time of a content item, e.g., a television advertisement, at the television provider and an air time of the content item at a viewing device. For example, the reporting engine 128 of FIG. 1, the log processing engine 502 of FIG. 5, or the impression receiver engine 620 and/or the impression processor engine 630 of FIG. 6A can identify a latency delay, such as the time between an insertion time of a television advertisement at the television provider and an actual display time of the television advertisement at a viewing device, or the time between an intended display time of a television advertisement and an actual display time of the television advertisement at a viewing device.

Stage 804 adjusts the tune times to compensate for the latency delay. For example, the reporting engine 128 of FIG. 1, the log processing engine 502 of FIG. 5, or the impression receiver engine 620 and/or the impression processor engine 630 of FIG. 6A can adjust the tune items in the reporting records to generate normalized reporting records.

Figure 9:
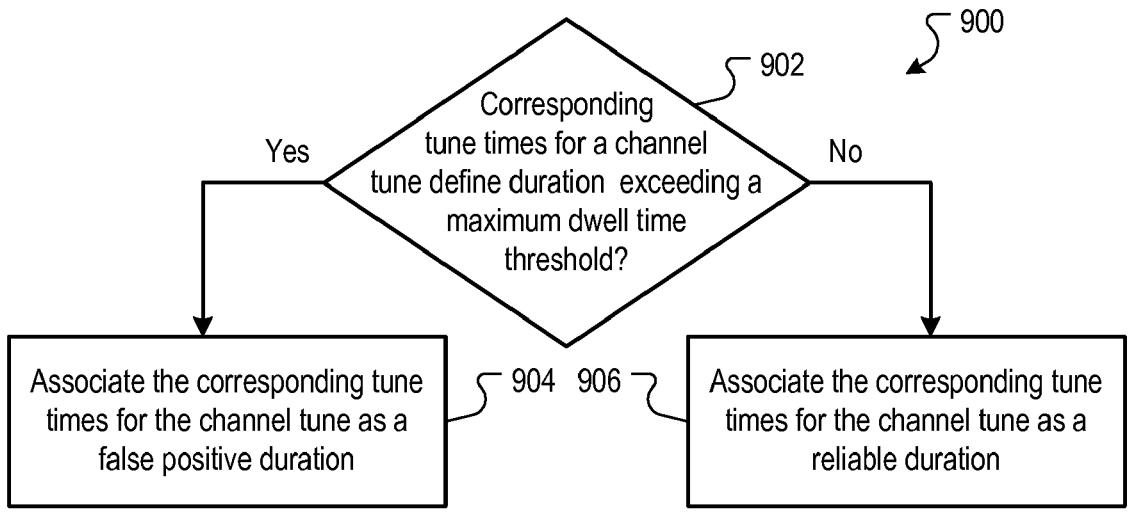
FIG. 9 is a flow diagram of an example process for identifying reliable durations and false positive durations.

FIG. 9 is a flow diagram of an example process for identifying reliable durations and false positive durations. The process 900 can, for example, be implemented in the television advertising system 100 of FIG. 1, or in the log processing system 500 of FIG. 5, or in the log processing system 600 of FIG. 6A.

Stage 902 determines if corresponding tune times for a channel tune define a duration exceeding a maximum dwell time threshold. For example, the reporting engine 128 of FIG. 1, the log processing engine 502 of FIG. 5, or the impression receiver engine 620 and/or the impression processor engine 630 of FIG. 6A can determine if tune times for a particular channel tune define a duration exceeding a maximum dwell time threshold, e.g., one hour.

If stage 902 determines that the corresponding tune times for a channel tune do define a duration exceeding the maximum dwell time threshold, then stage 904 associates the corresponding tune times for the channel tune as a false positive duration. For example, the reporting engine 128 of FIG. 1, the log processing engine 502 of FIG. 5, or the impression receiver engine 620 and/or the impression processor engine 630 of FIG. 6A can associate tune times defining a viewing duration of three hours with at least two hours of false positive duration, e.g., the last two hours of the three hours would not be utilized to generate impressions.

If, however, stage 902 determines that the corresponding tune times for a channel tune do not define a duration exceeding a maximum dwell time threshold, then stage 906 associates the corresponding tune times for the channel tune as a reliable duration. For example, the reporting engine 128 of FIG. 1, the log processing engine 502 of FIG. 5, or the impression receiver engine 620 and/or the impression processor engine 630 of FIG. 6A can associate tune times defining a viewing duration of thirty minutes as a reliable duration, e.g., the entire thirty minute duration can be utilized to generate impressions.

Figure 10:
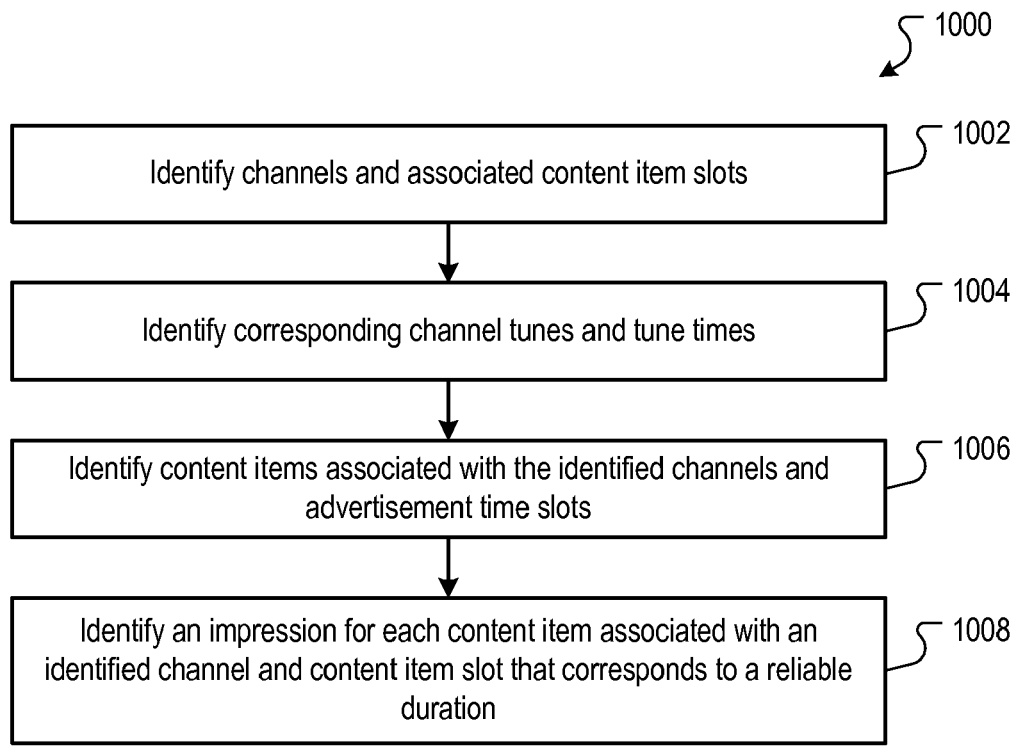
FIG. 10 is a flow diagram of another example process for processing logs and determining impressions from the processed logs.

FIG. 10 is a flow diagram of another example process for processing logs and determining impressions from the processed logs. The process 1000 can, for example, be implemented in the television advertising system 100 of FIG. 1, or in the log processing system 500 of FIG. 5, or in the log processing system 600 of FIG. 6A.

Stage 1002 identifies channels and associated content item slots, e.g., advertisement time slots, or advertisement overlay availabilities, etc. For example, the reporting engine 128 of FIG. 1, the log processing engine 502 of FIG. 5, or the impression analyzer engine 640 of FIG. 6A can identify channels and associated advertisement slots from the advertisement schedule 404.

Stage 1004 identifies corresponding channel tunes and tune times. For example, the reporting engine 128 of FIG. 1, the log processing engine 502 of FIG. 5, or the impression analyzer engine 640 of FIG. 6A can identify corresponding channel tunes and tune times from the impression data report 410.

Stage 1006 identifies content items, e.g., television advertisements, associated with the identified channels and the content item slots. For example, the reporting engine 128 of FIG. 1, the log processing engine 502 of FIG. 5, or the impression analyzer engine 640 can correlate the impression data report 410 with the advertisement schedule 404 to identify television advertisements associated with the channels and advertisement slots defined by the tune times and channel tunes.

Stage 1008 identifies an impression for each television advertisement associated with an identified channel and advertisement time slot that corresponds to a reliable duration. For example, the reporting engine 128 of FIG. 1, the log processing engine 502 of FIG. 5, or the impression analyzer engine 640 of FIG. 6A can generate an impression value for each identified television advertisement that aired on a channel tune during a reliable duration for that channel tune.

Figure 11:
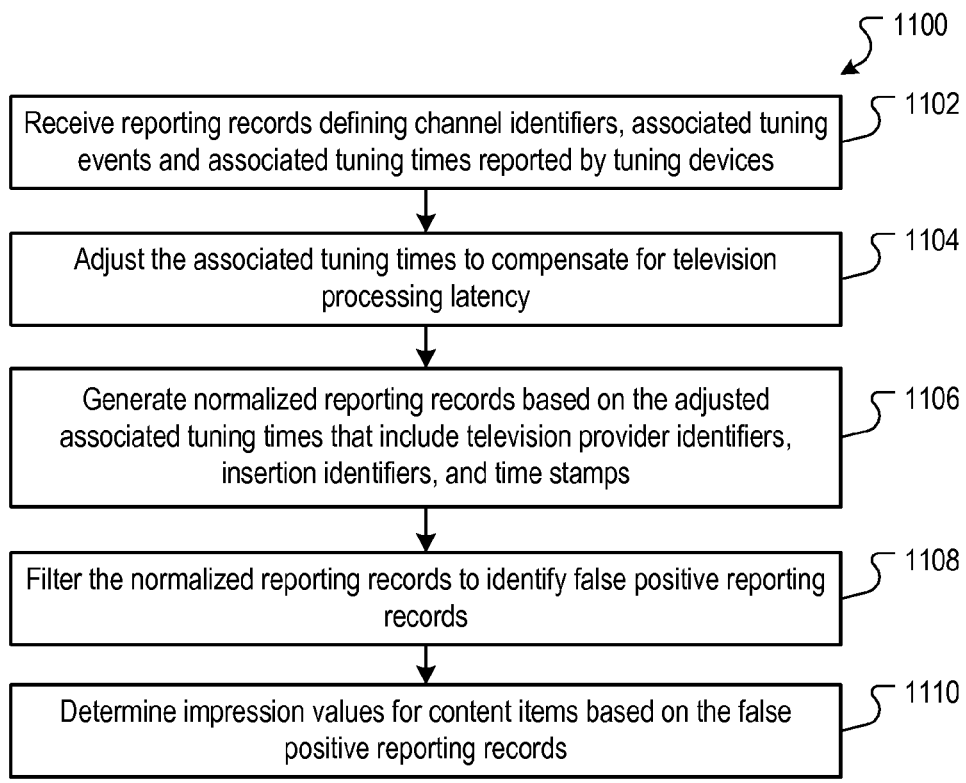
FIG. 11 is a flow diagram of another example process for processing logs and determining impressions from the processed logs.

FIG. 11 is a flow diagram of another example process for processing logs and determining impressions from the processed logs. The process 1100 can, for example, be implemented in the television advertising system 100 of FIG. 1, or in the log processing system 500 of FIG. 5, or in the log processing system 600 of FIG. 6A.

Stage 1102 receives reporting records defining channel identifiers, associated tuning events and associated tuning times reported by tuning devices. For example, the reporting engine 128 of FIG. 1, the log processing engine 502 of FIG. 5, or the impression receiver engine 620 and/or the impression processor engine 630 of FIG. 6A can receive reporting records from the television provider 160 or from a third party.

Stage 1104 adjusts the associated tuning times to compensate for television processing latency. For example, the reporting engine 128 of FIG. 1, the log processing engine 502 of FIG. 5, or the impression receiver engine 620 and/or the impression processor engine 630 of FIG. 6A can adjust the tune times by offsetting the tune times by the identified latency.

Stage 1106 generates normalized reporting records based on the adjusted associated tuning times that include television provider identifiers, insertion identifiers, and time stamps. For example, the reporting engine 128 of FIG. 1, the log processing engine 502 of FIG. 5, or the impression receiver engine 620 and/or the impression processor engine 630 of FIG. 6A can generate normalized reporting records that include the adjusted tune times and, if applicable, other data.

Stage 1108 filters the normalized reporting records to identify false positive reporting records. For example, the reporting engine 128 of FIG. 1, the log processing engine 502 of FIG. 5, or the impression receiver engine 620 and/or the impression processor engine 630 of FIG. 6A can identify reporting records for which a portion of the tune durations defined by the channel tunes are determined to be false positive durations, e.g., a tune duration of two hours may be determine to have 30 minutes of reliable duration and ninety minutes of false positive duration.

Stage 1110 determines impression values for content items, e.g., television advertisements, based on the false positive reporting records. For example, the reporting engine 128 of FIG. 1, the log processing engine 502 of FIG. 5, or the impression analyzer engine 640 of FIG. 6A can generate impression values from the channel tune durations determined not to be false positive durations, e.g., reliable durations.

Figure 12:
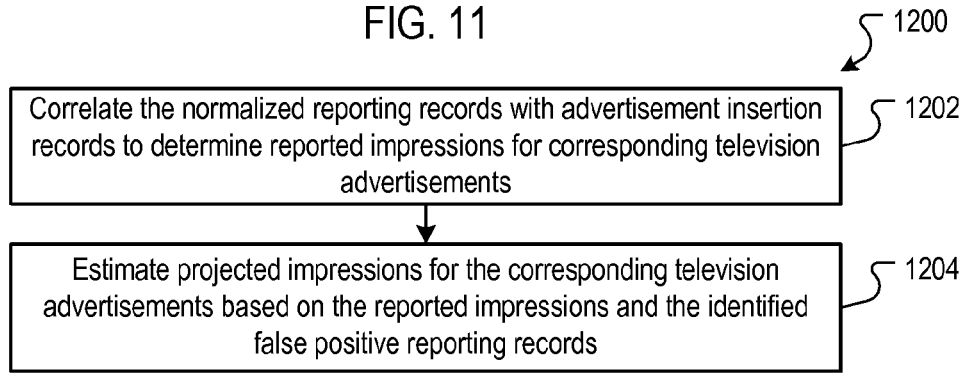
FIG. 12 is a flow diagram of an example process for estimating an impression total from log data.

FIG. 12 is a flow diagram of an example process 1200 for estimating an impression total from log data. The process 1200 can, for example, be implemented in the television advertising system 100 of FIG. 1, or in the log processing system 500 of FIG. 5, or in the log processing system 600 of FIG. 6A.

Stage 1202 correlates the normalized reporting records with advertisement insertion records to determine reported impressions for corresponding television advertisements. For example, the reporting engine 128 of FIG. 1, the log processing engine 502 of FIG. 5, or the impression analyzer engine 640 of FIG. 6A can correlate normalized reporting records with the advertisement schedule 404 to determine reported impressions corresponding to a television advertisement.

Stage 1204 estimates projected impressions for the corresponding television advertisements based on the reported impressions and the identified false positive reporting records. For example, the reporting engine 128 of FIG. 1, the log processing engine 502 of FIG. 5, or the impression analyzer engine 640 can estimate projected impressions for the corresponding television advertisements based on the reported impressions and the identified false positive reporting records.

Figure 13:
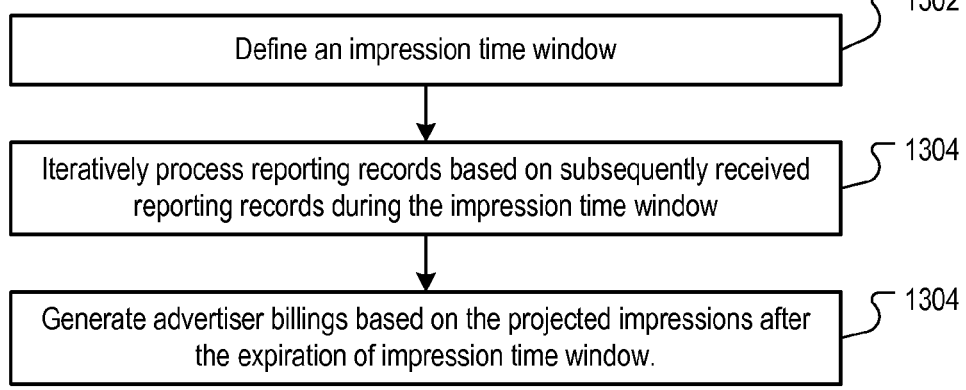
FIG. 13 is a flow diagram of an example process for iteratively processing logs.

FIG. 13 is a flow diagram of an example process 1300 for iteratively processing logs. The process 1300 can, for example, be implemented in the television advertising system 100 of FIG. 1, or in the log processing system 500 of FIG. 5, or in the impression receiver engine 620, the impression processor engine 630, the impression analyzer engine 640, and the reporting recorder engine 650 of FIG. 6A.

Stage 1302 defines an impression time window. For example, the reporting engine 128 of FIG. 1, the log processing engine 502 of FIG. 5, or the impression the reporting recorder engine 650 of FIG. 6A may define an impression time window, e.g., a week.

Stage 1304 iteratively process reporting records based on subsequently received reporting records during the impression time window. For example, the reporting engine 128 of FIG. 1, the log processing engine 502 of FIG. 5, or the impression receiver engine 620, the impression processor engine 630, the impression analyzer engine 640, and the reporting recorder engine 650 of FIG. 6A may iteratively process the reporting records each time reporting records related to a particular advertisement availability are received during the impression time window.

Stage 1306 generates advertiser billings based on the projected impressions after the expiration of impression time window. For example, the reporting engine 128 of FIG. 1, the log processing engine 502 of FIG. 5, or the reporting recorder engine 650 of FIG. 6A may generate billings after the expiration of the impression time window.

Figure 14:
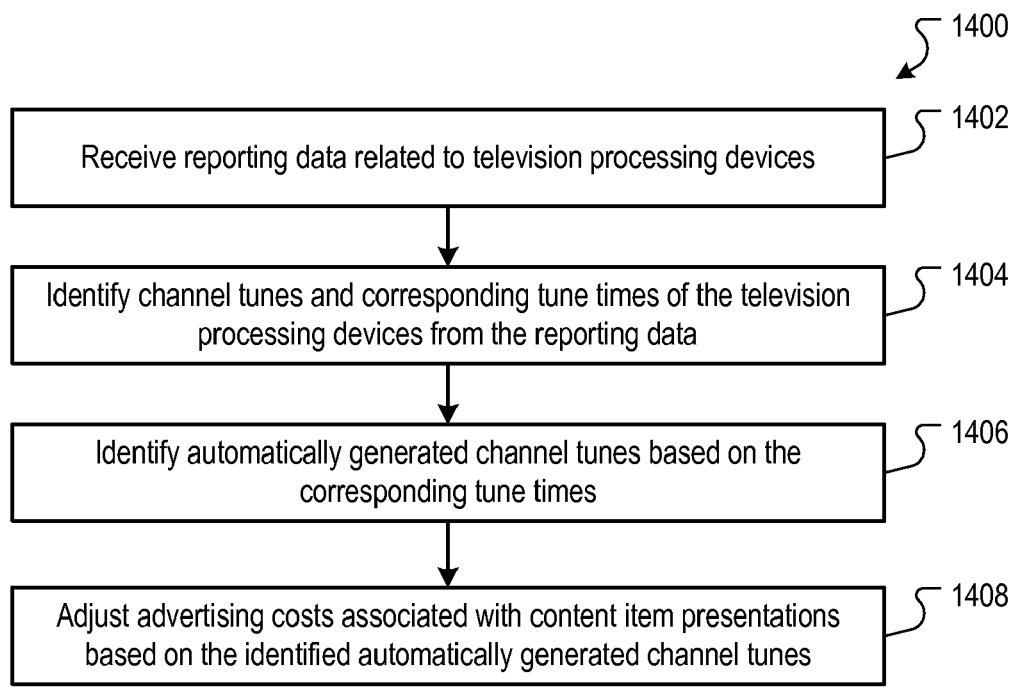
FIG. 14 is a flow diagram of an example process for adjusting advertising costs based on automatically generated channel tune times.

FIG. 14 is a flow diagram of an example process 1400 for adjusting advertising costs based on automatically generated channel tune times. The process 1400 can, for example, be implemented in the television advertising system 100 of FIG. 1, or in the impression receiver engine 620, the automated tuning detection engine 660, and the reporting recorder engine 650 of FIG. 6A.

Stage 1402 receives reporting data related to television processing devices. For example, the reporting engine 128 of FIG. 1, or the automated tuning detection engine 660 of FIG. 6A can receive reporting data related to television processing devices, e.g., set top box metering records.

Stage 1404 identifies channel tunes and corresponding tune times of the television processing devices from the reporting data. For example, the reporting engine 128 of FIG. 1, or the automated tuning detection engine 660 of FIG. 6A can identify channel tunes and corresponding tune times of the television processing devices from the reporting data.

Stage 1406 identifies automatically generated channel tunes based on the corresponding tune times. For example, the reporting engine 128 of FIG. 1, or the automated tuning detection engine 660 of FIG. 6A can identify automatically generated channel tunes based on the corresponding tune times. For example, the tune times of channel tunes can be compared to characteristic tune times; or can be highly correlated with a channel tune cluster; or can correspond to program broadcast times defined in electronic programming guide data.

Stage 1408 adjusts advertising costs associated with the presentation of content items, e.g., advertisements, based on the identified automatically generated channel tunes. For example, the accounting engine 130 or the reporting engine 650 can adjust advertising costs associated with advertisements based on the identified automatically generated channel tunes.

Figure 15:
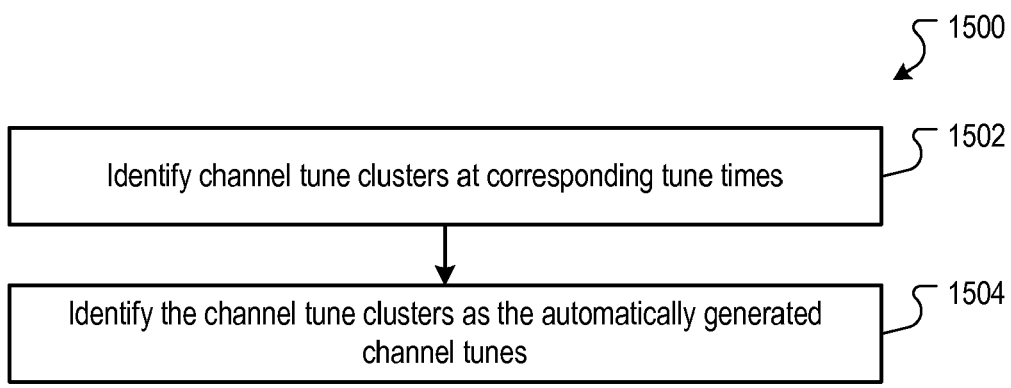
FIG. 15 is a flow diagram of an example process for identifying automatically generated channel tunes.

FIG. 15 is a flow diagram of an example process 1500 for identifying automatically generated channel tunes. The process 1500 can, for example, be implemented in the television advertising system 100 of FIG. 1, or in the automated tuning detection engine 660 of FIG. 6A.

Stage 1502 identifies channel tune clusters at corresponding tune times. For example, the reporting engine 128 of FIG. 1, or the automated tuning detection engine 660 of FIG. 6A can identify channel tune clusters at corresponding tune times.

Stage 1504 identifies the channel tune clusters as the automatically generated channel tunes. For example, the reporting engine 128 of FIG. 1, or the automated tuning detection engine 660 of FIG. 6A can identify the channel tune clusters as the automatically generated channel tunes.

Figure 16:
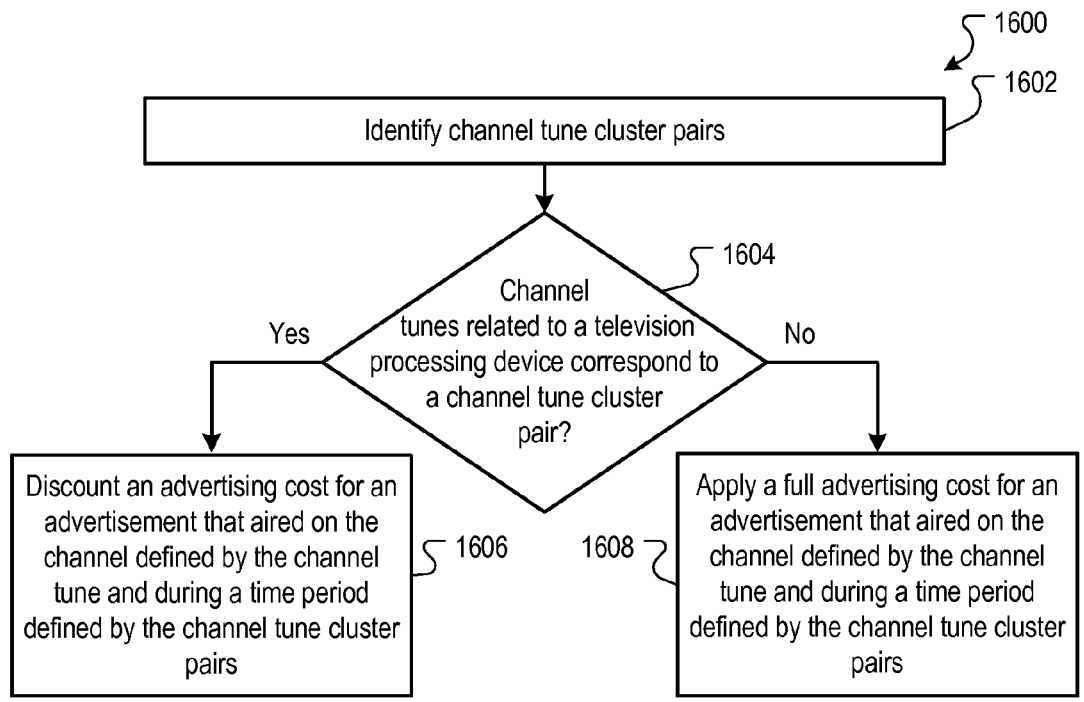
FIG. 16 is a flow diagram of an example process for adjusting advertising costs based on identified channel tune clusters.

FIG. 16 is a flow diagram of an example process 1600 for adjusting advertising costs based on identified channel tune clusters. The process 1600 can, for example, be implemented in the television advertising system 100 of FIG. 1, or in the automated tuning detection engine 660 and the reporting recorder engine 650 of FIG. 6A.

Stage 1602 identifies channel tune cluster pairs. For example, the reporting engine 128 of FIG. 1, or the automated tuning detection engine 660 of FIG. 6A can identify channel tune cluster pairs, e.g., channel tune clusters proximate to the time of 20:30:00 and 21:00:00, for example.

Stage 1604 determines if the identified channel tunes related to a television processing device correspond to a channel tune cluster pair. For example, the reporting engine 128 of FIG. 1, or the automated tuning detection engine 660 of FIG. 6A can determine if the identified channel tunes for a television processing device occurred at a channel tune cluster pair, e.g., a tune-in to a channel at 20:29:00, and a tune-out from the channel or turn off of the television processing device at a time of 21:03:00, for example.

If stage 1604 determines that the identified channel tunes related to a television processing device correspond to a channel tune cluster pair, then stage 1606 discounts an advertising cost for an advertisement that aired on the channel defined by the channel tune and during a time period defined by the channel tune cluster pairs. For example, the accounting engine 130 or the reporting engine 650 can discount an advertising cost for an advertisement that aired on the channel defined by the channel tune and during a time period defined by the channel tune cluster pairs.

Conversely, if stage 1604 determines that the identified channel tunes related to a television processing device do not correspond to a channel tune cluster pair, then stage 1608 applies a full advertising cost for an advertisement that aired on the channel defined by the channel tune and during a time period defined by the channel tune cluster pairs. For example, the accounting engine 130 or the reporting engine 650 can apply a full advertising cost for an advertisement that aired on the channel defined by the channel tune and during a time period defined by the channel tune cluster pairs.

In another implementation, a confidence factor can be utilized to adjust an advertising cost. For example, a confidence factor of 100% can be associated with a 33:00 minute dwell time beginning at 20:29:00, and the full advertising cost can be applied; a confidence factor of 80% can be associated with a 30:00 minute dwell time beginning at 20:30:00, and the advertising cost can be adjusted to 80% of the full price; a confidence factor of 70% can be associated with a 30:00 minute dwell time beginning at 20:29:00, etc. Multiple confidence factors can also be applied in product form, e.g., an 80% confidence factor can further scale a 60% adjustment of advertisements that likely recorded so that the coast of the advertisements are at 48% of the full price, etc.

Figure 17:
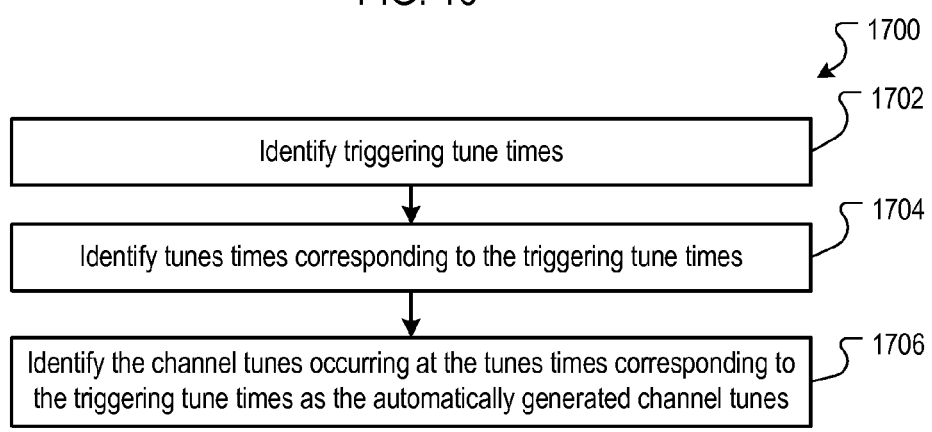
FIG. 17 is a flow diagram of another example process for identifying automatically generated channel tunes.

FIG. 17 is a flow diagram of another example process 1700 for identifying automatically generated channel tunes. The process 1700 can, for example, be implemented in the television advertising system 100 of FIG. 1, or in the impression receiver engine 620, the automated tuning detection engine 660, and the reporting recorder engine 650 of FIG. 6A.

Stage 1702 identifies triggering tune times. For example, the reporting engine 128 of FIG. 1, or the automated tuning detection engine 660 of FIG. 6A can identify tune times that are often utilized by automated recording devices, such as programming start times and end times for television programs, or rounded time values, e.g., 18:29:00, 18:30:00, 18:31:00, etc.

Stage 1704 identifies tunes times corresponding to the triggering tune times. For example, the reporting engine 128 of FIG. 1, or the automated tuning detection engine 660 of FIG. 6A can determine if tune times in the reporting recodes correspond to triggering tune times, e.g., whether a first tune time for a particular television processing device correspond to a triggering tune time of 19:29:00, 19:30:00, 19:31:00, or some other triggering tune time.

Stage 1706 identifies the channel tunes occurring at the tunes times corresponding to the triggering tune times as the automatically generated channel tunes. For example, the reporting engine 128 of FIG. 1, or the automated tuning detection engine 660 of FIG. 6A can identifying a channel tune occurring at a tune time of 19:29:00 as an automatically generated channel tune.

Figure 18:
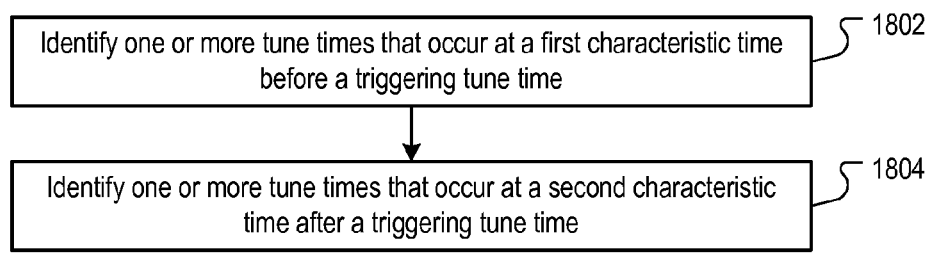
FIG. 18 is a flow diagram of another example process for identifying automatically generated channel tunes.

FIG. 18 is a flow diagram of another example process 1800 for identifying automatically generated channel tunes. The process 1800 can, for example, be implemented in the television advertising system 100 of FIG. 1, or in the impression receiver engine 620, the automated tuning detection engine 660, and the reporting recorder engine 650 of FIG. 6A.

Stage 1802 identifies one or more tune times that occur at a first characteristic times before a triggering tune time. For example, the reporting engine 128 of FIG. 1, or the automated tuning detection engine 660 of FIG. 6A can identify tune times that occur at 19:29:00, 19:30:00, and 19:31:00 for a triggering tune time of 19:30:00.

Stage 1804 identifies one or more tune times that occur at a second characteristic times after a triggering tune time. For example, the reporting engine 128 of FIG. 1, or the automated tuning detection engine 660 of FIG. 6A can identify tune time of 20:01:00 for the triggering tune time of 19:30:00, e.g., 31 minutes after the triggering tune time of 19:30:00.

In some implementations, the reporting engine 128 of FIG. 1 or the automated tuning detection engine 660 of FIG. 6A can determining if time periods defined by the tune times that occur at first characteristic tune times and by the tune times that occur at the second characteristic tune times correspond to dwell time clusters. Upon a positive determination, the channel tunes occurring at the tunes times corresponding to the triggering tune times can be identified as automatically generated channel tunes. For example, two consecutive tune times for a first set top box may be 19:32:00 and 19:59:00. While these tune times may occur at characteristic times, the corresponding dwell time of 27 minutes may not belong to a dwell time cluster. Accordingly, the tune times may have been viewer-triggered and by coincidence occurred at characteristic times. Accordingly, the corresponding channel tunes can be considered viewer-triggered.

Conversely, two consecutive tune times for a second set top box may be 19:29:00 and 20:02:00. These tune times may occur at characteristic times, and the corresponding dwell time of 32 minutes may also belong to a dwell time cluster. Accordingly, theses tune times are more likely to have been automatically generated.

Other reporting data can also be processed to determine impressions as described herein. For example, DVR-related reporting data can include viewing time data, e.g., data indicating when DVR-rendered data appeared on a television display. The viewing time data can be mapped from an original airtime to the delayed viewing time to determine whether an impression occurred.

While the system and methods have been described herein with respect to identifying impressions for television advertisements, the systems and methods describe herein can also be utilized to determine viewer behavior for other contexts, such as behavior models in the context of entry to commercial breaks, opening credits, closing credits, bottom of the hour commercial breaks, special broadcast interruptions, e.g., news events, sporting events extending beyond a scheduled broadcast time, etc. Such behavior models can, for example, be utilized to identify option content for presentation at certain times, e.g., 20-second "squeeze" advertisements rendered alongside closing credits perform better than a full 60-second advertisement presented after the closing credits, etc.

Additionally, the system and methods can also be utilized to perform impression processing for other content items, e.g., public service announcements, special announcements, etc. Processing of impressions for content items in other media that provide reporting logs can also be facilitated, e.g., radio systems that provide log data either in-band (over an RF channel) or out-of-band (over a non-carrier channel, wired network, etc.). For example, song impressions for a song on a radio can be measured, e.g., whether users tune to another radio channel when a song was aired, etc.; or whether user recorded a radio program, etc.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   receiving reporting data related to television processing devices;
   identifying channel tunes and corresponding tune times of the television processing devices from the reporting data;
   identifying channel tune clusters at corresponding tune times; and
   determining that the channel tune clusters are automatically generated channel tunes if, for each channel tune cluster, the channel tunes for that channel tune cluster are generated at a particular tune time for that channel tune cluster.

2. The method of claim 1, wherein identifying channel tune clusters at corresponding tune times comprises:
   identifying dwell time counts for a first time period for television processing devices from the reporting data; and
   identifying a proportional increase in a dwell time counts relative to a prior dwell time count period and a subsequent dwell time count period.

3. The method of claim 2, wherein identifying the channel tune clusters at corresponding tune times comprises:
   determining whether the proportional increase exceeds a threshold; and
   identifying the channel tunes as a channel tune cluster if the proportional increase exceeds the threshold.

4. The method of claim 1, comprising:
   identifying channel tune cluster pairs;
   determining if channel tunes related to a television processing device correspond to a channel tune cluster pair; and
   if the channel tunes related to the television processing device correspond to a channel tune cluster pair, then adjusting an advertising cost for an advertisement that aired on the channel defined by the channel tune and during a time period defined by the channel tune cluster pairs.

5. The method of claim 4, wherein adjusting an advertising cost comprises one of discounting the advertising cost, delaying the advertising cost, or waiving the advertising cost.

6. The method of claim 5, wherein adjusting an advertising cost comprises discounting the advertising cost in substantial proportion to a length of the time period defined by the channel tune cluster pair.

7. The method of claim 5, comprising:
identifying unassociated channel tunes related to the television processing device relative to the time period defined by the channel tune cluster pairs; and
wherein adjusting the advertising cost comprises discounting the advertising cost based on the identified unassociated channel tunes.

8. The method of claim 7, wherein discounting the advertising cost based on the identified unassociated channel tunes comprises precluding a discount of an advertising cost if the unassociated channel tunes indicate a probable viewer presence.

9. The method of claim 7, wherein discounting the advertising cost comprises discounting the advertising cost in substantial inverse proportion to a proximity in time of unassociated channel tunes to the time period defined by the channel tune cluster pair.

10. A computer-implemented method, comprising:
receiving reporting data related to a television processing device;
identifying channel tunes and corresponding tune times of the television processing device from the reporting data;
identifying channel tune clusters at triggering tune times;
identifying tunes times corresponding to the triggering tune times; and
for each channel tune cluster, determining that the channel tunes are automatically generated channel tunes if, for each channel tune cluster, the channel tunes for that channel tune cluster are generated at a particular tune time that corresponds to a triggering tune time for that channel tune cluster.

11. The method of claim 10, wherein identifying triggering tune times comprises:
identifying programming start times and end times for television programs.

12. The method of claim 11, wherein identifying tunes times corresponding to the triggering tune times comprises:
identifying tunes times occurring at the triggering tune times.

13. The method of claim 11, wherein identifying tunes times corresponding to the triggering tune times comprises:
identifying tunes times occurring at pad times relative to the triggering tune times.

14. The method of claim 10, wherein identifying tunes times corresponding to the triggering tune times comprises:
identifying tune times that occur at a first characteristic time before a triggering tune time; and
identifying tune times that occur at a second characteristic time after a triggering tune time.

15. The method of claim 14, wherein determining that the channel tunes are automatically generated channel tunes comprises:
determining if time periods defined by the tune times that occur at first characteristic tune times and by the tune times that occur at the second characteristic tune times correspond to dwell time clusters; and
if the time periods defined by the tune times that occur at first characteristic tune times and by the tune times that occur at the second characteristic tune times correspond to dwell time clusters, then identifying channel tunes occurring at the tunes times corresponding to the triggering tune times as automatically generated channel tunes.

16. The method of claim 10, comprising:
adjusting an advertising cost for an advertisement that aired on a channel defined by an automatically generated channel tune.

17. The method of claim 10, comprising:
identifying automatically generated channel tune pairs and corresponding tune times for a television processing device; and
adjusting an advertising cost for an advertisement that aired on the channel defined by the channel tune and during a time period defined by the corresponding tune times.

18. The method of claim 17, wherein adjusting an advertising cost comprises discounting the advertising cost in substantial proportion to length of the time period defined by the corresponding tune times.

19. The method of claim 17, comprising:
identifying unassociated channel tunes related to the television processing device relative to the time period time period defined by the corresponding tune times; and
adjusting a discount of the advertising cost based on the identified unassociated channel tunes.

20. The method of claim 19, wherein adjusting the discount of the advertising cost based on the identified unassociated channel tunes comprises precluding a discount of the advertising cost if the unassociated channel tunes indicate a probable viewer presence.

21. The method of claim 10, wherein determining that the channel tunes are automatically generated channel tunes comprises:
determining a coincidental channel tunes value; and
subtracting the coincidental channel tunes value from the automatically generated channel tunes.

22. A system, comprising:
an automated tuning detection engine implemented in a computer processing system configured to cause the computer processing system to perform operations comprising:
receive reporting data related to television processing devices;
identify channel tunes and corresponding tune times of the television processing devices from the reporting data;
identify channel tune clusters at corresponding tune times; and
determine that the channel tune clusters are automatically generated channel tunes if, for each channel tune cluster, the channel tunes for that channel tune cluster are generated at a particular tune time for that channel tune cluster; and
an accounting engine configured to adjust advertising costs associated with advertisements based on the identified automatically generated channel tune times.

23. The system of claim 22 wherein the automated tuning detection engine is configured to:
identify triggering tune times;
identify tunes times corresponding to the triggering tune times; and
determine the channel tunes occurring at the identified tunes times corresponding to the triggering tune times are the automatically generated channel tunes.

* * * * *

UNITED STATES PATENT AND TRADEMARK OFFICE
CERTIFICATE OF CORRECTION

PATENT NO. : 7,743,394 B2  Page 1 of 1
APPLICATION NO. : 11/852788
DATED : June 22, 2010
INVENTOR(S) : Geoffrey R. Smith It is certified that error appears in the above-identified patent and that said Letters Patent is hereby corrected as shown below:

Col. 36, Line 23, please delete duplicate "time period".

Signed and Sealed this

Twelfth Day of October, 2010

David J. Kappos
*Director of the United States Patent and Trademark Office*